US008296412B2

(12) United States Patent
Secor et al.

(10) Patent No.: US 8,296,412 B2
(45) Date of Patent: Oct. 23, 2012

(54) METHOD AND SYSTEM FOR EVENT IMPACT ANALYSIS

(75) Inventors: Peter Secor, New York, NY (US); Tim Tokarsky, Brooklyn, NY (US); Shoel Perelman, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 2122 days.

(21) Appl. No.: 10/756,843

(22) Filed: Jan. 13, 2004

(65) Prior Publication Data

US 2005/0027845 A1 Feb. 3, 2005

(51) Int. Cl.
*G06F 15/173* (2006.01)

(52) U.S. Cl. ........................................ 709/224; 709/223

(58) Field of Classification Search .................. 709/223, 709/224

See application file for complete search history.

(56) References Cited

U.S. PATENT DOCUMENTS

| | | | |
|---|---|---|---|
| 3,855,456 | A | 12/1974 | Summers et al. |
| 3,906,454 | A | 9/1975 | Martin |
| 4,135,662 | A | 1/1979 | Dlugos |
| 4,410,950 | A | 10/1983 | Toyoda et al. |
| 4,438,494 | A | 3/1984 | Budde et al. |
| 4,503,534 | A | 3/1985 | Budde et al. |
| 4,503,535 | A | 3/1985 | Budde et al. |
| 4,517,468 | A | 5/1985 | Kemper et al. |
| 4,545,013 | A | 10/1985 | Lyon et al. |
| 4,568,909 | A | 2/1986 | Whynacht |
| 4,585,975 | A | 4/1986 | Wimmer |
| 4,591,983 | A | 5/1986 | Bennett et al. |
| 4,622,545 | A | 11/1986 | Atkinson |
| 4,648,044 | A | 3/1987 | Hardy et al. |
| 4,727,545 | A | 2/1988 | Glackemeyer et al. |
| 4,817,092 | A | 3/1989 | Denny |
| 4,823,345 | A | 4/1989 | Daniel et al. |
| 4,866,712 | A | 9/1989 | Chao |
| 4,881,230 | A | 11/1989 | Clark et al. |

(Continued)

FOREIGN PATENT DOCUMENTS

| | | |
|---|---|---|
| EP | 0 209 795 | 1/1987 |

(Continued)

OTHER PUBLICATIONS

Subramanian, Mani, Network Management: Principles and Practice, Addison Wesley Longman, 2000.

(Continued)

*Primary Examiner* — Brian P Whipple

(74) *Attorney, Agent, or Firm* — Seth H. Ostrow; Ostrow Kaufman LLP

(57) ABSTRACT

An impact analysis software system is described which resides on a computer connected to a network in an enterprise. The system analyzes the impact of network events on the network, and includes a number of modules, including a number of data source adapters for interfacing with external data sources to thereby allow access by the system to enterprise-related data in the external data sources. The system further includes an impact analysis data structure populated with data accessed from the external data sources and defining relationships between the enterprise-related data. One or more action tree data structures comprise a routine which, when executed, acts upon the relationships defined by the impact analysis data structure to handle events. A message processor reads the network events and select one of the action tree data structures to handle each read network event.

20 Claims, 15 Drawing Sheets

U.S. PATENT DOCUMENTS

| | | | | | |
|---|---|---|---|---|---|
| 4,914,657 | A | | 4/1990 | Walter et al. | |
| 4,932,026 | A | | 6/1990 | Dev et al. | |
| 4,935,876 | A | | 6/1990 | Hanatsuka | |
| 5,107,497 | A | | 4/1992 | Lirov et al. | |
| 5,109,486 | A | | 4/1992 | Seymour | |
| 5,123,017 | A | | 6/1992 | Simpkins et al. | |
| 5,125,091 | A | | 6/1992 | Staas, Jr. et al. | |
| 5,133,075 | A | | 7/1992 | Risch | |
| 5,159,685 | A | | 10/1992 | Kung | |
| 5,179,556 | A | | 1/1993 | Turner | |
| 5,204,955 | A | | 4/1993 | Kagei et al. | |
| 5,214,653 | A | | 5/1993 | Elliott, Jr. et al. | |
| 5,247,517 | A | | 9/1993 | Ross et al. | |
| 5,261,044 | A | | 11/1993 | Dev et al. | |
| 5,293,629 | A | | 3/1994 | Conley et al. | |
| 5,295,244 | A | | 3/1994 | Dev et al. | |
| 5,309,448 | A | | 5/1994 | Bouloutas et al. | |
| 5,321,837 | A | | 6/1994 | Daniel et al. | |
| 5,375,070 | A | | 12/1994 | Hershey et al. | |
| 5,432,934 | A | | 7/1995 | Levin et al. | |
| 5,436,909 | A | | 7/1995 | Dev et al. | |
| 5,483,637 | A | | 1/1996 | Winokur et al. | |
| 5,485,455 | A | | 1/1996 | Dobbins et al. | |
| 5,491,694 | A | | 2/1996 | Oliver et al. | |
| 5,495,470 | A | | 2/1996 | Tyburski et al. | |
| 5,504,921 | A | | 4/1996 | Dev et al. | |
| 5,521,910 | A | | 5/1996 | Matthews | |
| 5,528,516 | A | | 6/1996 | Yemini et al. | |
| 5,557,747 | A | * | 9/1996 | Rogers et al. | 709/223 |
| 5,559,955 | A | | 9/1996 | Dev et al. | |
| 5,590,120 | A | | 12/1996 | Vaishnavi et al. | |
| 5,627,819 | A | | 5/1997 | Dev et al. | |
| 5,649,103 | A | | 7/1997 | Datta et al. | |
| 5,666,481 | A | | 9/1997 | Lewis | |
| 5,675,741 | A | | 10/1997 | Aggarwal et al. | |
| 5,687,290 | A | | 11/1997 | Lewis | |
| 5,696,486 | A | | 12/1997 | Poliquin et al. | |
| 5,706,436 | A | | 1/1998 | Lewis et al. | |
| 5,708,820 | A | * | 1/1998 | Park et al. | 713/323 |
| 5,722,427 | A | | 3/1998 | Wakil et al. | |
| 5,727,157 | A | | 3/1998 | Orr et al. | |
| 5,734,642 | A | | 3/1998 | Vaishnavi et al. | |
| 5,748,781 | A | | 5/1998 | Datta et al. | |
| 5,748,884 | A | * | 5/1998 | Royce et al. | 714/57 |
| 5,751,933 | A | | 5/1998 | Dev et al. | |
| 5,751,965 | A | | 5/1998 | Mayo et al. | |
| 5,754,532 | A | | 5/1998 | Dev et al. | |
| 5,761,502 | A | * | 6/1998 | Jacobs | 707/103 R |
| 5,764,955 | A | | 6/1998 | Doolan | |
| 5,768,501 | A | | 6/1998 | Lewis | |
| 5,777,549 | A | | 7/1998 | Arrowsmith et al. | |
| 5,790,546 | A | | 8/1998 | Dobbins et al. | |
| 5,791,694 | A | | 8/1998 | Fahl et al. | |
| 5,793,362 | A | | 8/1998 | Matthew et al. | |
| 5,812,750 | A | | 9/1998 | Dev et al. | |
| 5,822,305 | A | | 10/1998 | Vaishnavi et al. | |
| 5,832,503 | A | | 11/1998 | Malik et al. | |
| 5,872,928 | A | | 2/1999 | Lewis et al. | |
| 5,889,953 | A | | 3/1999 | Thebaut et al. | |
| 5,907,696 | A | | 5/1999 | Stilwell et al. | |
| 5,940,376 | A | | 8/1999 | Yanacek et al. | |
| 5,970,984 | A | | 10/1999 | Wakil et al. | |
| 5,980,984 | A | | 11/1999 | Modera et al. | |
| 5,987,247 | A | * | 11/1999 | Lau | 717/100 |
| 5,987,442 | A | | 11/1999 | Lewis et al. | |
| 6,000,045 | A | | 12/1999 | Lewis | |
| 6,003,090 | A | | 12/1999 | Puranik et al. | |
| 6,014,697 | A | | 1/2000 | Lewis et al. | |
| 6,026,442 | A | | 2/2000 | Lewis et al. | |
| 6,041,383 | A | | 3/2000 | Jeffords et al. | |
| 6,049,828 | A | | 4/2000 | Dev et al. | |
| 6,057,757 | A | | 5/2000 | Arrowsmith et al. | |
| 6,064,304 | A | | 5/2000 | Arrowsmith et al. | |
| 6,064,986 | A | | 5/2000 | Edelman | |
| 6,064,996 | A | | 5/2000 | Yamaguchi et al. | |
| 6,084,858 | A | | 7/2000 | Matthews et al. | |
| 6,098,047 | A | * | 8/2000 | Oku et al. | 705/7 |
| 6,115,362 | A | | 9/2000 | Bosa et al. | |
| 6,118,936 | A | * | 9/2000 | Lauer et al. | 709/224 |
| 6,131,112 | A | | 10/2000 | Lewis et al. | |
| 6,138,122 | A | | 10/2000 | Smith et al. | |
| 6,141,720 | A | | 10/2000 | Jeffords et al. | |
| 6,199,172 | B1 | | 3/2001 | Dube et al. | |
| 6,205,563 | B1 | | 3/2001 | Lewis | |
| 6,209,033 | B1 | | 3/2001 | Datta et al. | |
| 6,216,168 | B1 | | 4/2001 | Dev et al. | |
| 6,233,623 | B1 | | 5/2001 | Jeffords et al. | |
| 6,243,747 | B1 | | 6/2001 | Lewis et al. | |
| 6,255,943 | B1 | | 7/2001 | Lewis et al. | |
| 6,324,530 | B1 | | 11/2001 | Yamaguchi et al. | |
| 6,324,590 | B1 | | 11/2001 | Jeffords et al. | |
| 6,332,130 | B1 | * | 12/2001 | Notani et al. | 705/28 |
| 6,336,138 | B1 | | 1/2002 | Caswell et al. | |
| 6,349,306 | B1 | | 2/2002 | Malik et al. | |
| 6,373,383 | B1 | | 4/2002 | Arrowsmith et al. | |
| 6,374,293 | B1 | | 4/2002 | Dev et al. | |
| 6,381,639 | B1 | | 4/2002 | Thebaut et al. | |
| 6,392,667 | B1 | | 5/2002 | McKinnon et al. | |
| 6,393,386 | B1 | * | 5/2002 | Zager et al. | 703/25 |
| 6,421,719 | B1 | | 7/2002 | Lewis et al. | |
| 6,430,712 | B2 | | 8/2002 | Lewis | |
| 6,437,804 | B1 | | 8/2002 | Ibe et al. | |
| 6,470,384 | B1 | * | 10/2002 | O'Brien et al. | 709/223 |
| 6,502,079 | B1 | | 12/2002 | Ball et al. | |
| 6,505,253 | B1 | * | 1/2003 | Chiu et al. | 709/235 |
| 6,510,478 | B1 | | 1/2003 | Jeffords et al. | |
| 6,603,396 | B2 | | 8/2003 | Lewis et al. | |
| 6,651,062 | B2 | | 11/2003 | Ghannam et al. | |
| 6,694,362 | B1 | * | 2/2004 | Secor et al. | 709/223 |
| 7,103,652 | B1 | * | 9/2006 | Dobberpuhl et al. | 709/223 |
| 2001/0013107 | A1 | | 8/2001 | Lewis | |
| 2001/0042139 | A1 | | 11/2001 | Jeffords et al. | |
| 2001/0047409 | A1 | | 11/2001 | Datta et al. | |
| 2001/0047430 | A1 | | 11/2001 | Dev et al. | |
| 2001/0052085 | A1 | | 12/2001 | Dube et al. | |
| 2002/0019945 | A1 | * | 2/2002 | Houston et al. | 713/201 |
| 2002/0032760 | A1 | | 3/2002 | Matthews et al. | |
| 2002/0050926 | A1 | | 5/2002 | Lewis et al. | |
| 2002/0075882 | A1 | | 6/2002 | Donis et al. | |
| 2002/0143917 | A1 | * | 10/2002 | Stevenson et al. | 709/223 |
| 2002/0184528 | A1 | | 12/2002 | Shevenell et al. | |
| 2002/0188584 | A1 | | 12/2002 | Ghannam et al. | |
| 2003/0110396 | A1 | | 6/2003 | Lewis et al. | |

FOREIGN PATENT DOCUMENTS

| | | | |
|---|---|---|---|
| EP | 0 319 998 | B1 | 6/1989 |
| EP | 0 338 561 | B1 | 10/1989 |
| EP | 0 342 547 | B1 | 11/1989 |
| EP | 0 616 289 | | 9/1994 |
| EP | 0 686 329 | B1 | 12/1995 |
| WO | WO 89/07377 | | 8/1989 |
| WO | WO 93/00632 | | 1/1993 |
| WO | WO 95/20297 | | 7/1995 |
| WO | WO 96/09707 | | 3/1996 |
| WO | WO 97/16906 | | 5/1997 |
| WO | WO 97/29570 | | 8/1997 |
| WO | WO 97/37477 | | 10/1997 |
| WO | WO 97/44937 | | 11/1997 |
| WO | WO 98/42109 | | 9/1998 |
| WO | WO 98/44682 | | 10/1998 |
| WO | WO 98/52322 | | 11/1998 |
| WO | WO 99/27682 | | 6/1999 |
| WO | WO 00/13112 | | 3/2000 |
| WO | WO 00/72183 | | 11/2000 |
| WO | WO 01/86380 | | 11/2001 |
| WO | WO 01/86443 | | 11/2001 |
| WO | WO 01/86444 | | 11/2001 |
| WO | WO 01/86775 | | 11/2001 |
| WO | WO 01/86844 | | 11/2001 |
| WO | WO 02/06971 | | 1/2002 |
| WO | WO 02/06972 | | 1/2002 |
| WO | WO 02/06973 | | 1/2002 |

OTHER PUBLICATIONS

Lewis, Lundy, Service Level Management for Enterprise Networks, Artech House, 1999.

Integrated Network Management V: Integrated Management in a Virtual World, Proceedings of the Fifth IFIP/IEEE International Symposium on Integrated Network Management, San Diego, California, May 12-16, 1997, Lazar A. et. al, eds., Chapman & Hall, 1997.

Stevenson Douglas W., Network Management: What it is and what it isn't, Apr. 1995, http://www.sce.carleton.ca/netmanage/NetMngmnt/NetMngmnt.html (visited Aug. 30, 2004).

Network and Distributed Systems Management, Morris Sloman, Ed., Addison-Wesley, 1994.

RFC 1158—Management Information Base for network management of TCP/IP-based internets: MIB-II, Network Working Group, M. Rose, Ed., May 1990, http://www.faqs.org/rfcs/rfc1158.html (visited Aug. 30, 2004).

RFC 1157—Simple Network Management Protocol (SNMP), Network Working Group, J. Case et al., Eds., May 1990, http://www.faqs.org/rfcs/rfc1157.html (visited Aug. 30, 2004).

RFC 1156—Management Information Base for network management of TCP/IP-based internets, Network Working Group, K. McCloghrie and M. Rose, EdS., May 1990, http://www.faqs.org/rfcs/rfc1156.html (visited Aug. 30, 2004).

RFC 1155—Structure and identification of management information for TCP/IP-based internets, Network Working Group, M. Rose and K. McCloghrie, Eds., May 1990, http://www.faqs.org/rfcs/rfc1155.html (visited Aug. 30, 2004).

ISO/IEC 10164-1: 1993, Information technology—Open Systems Interconnection—Systems Management: Object Management Function.

ISO/IEC 10164-2:1993, Information technology—Open Systems Interconnection—Systems Management: State Management Function.

ISO/IEC 10164-4:1992, Information technology—Open Systems Interconnection—Systems management: Alarm reporting function.

ISO/IEC 10164-5:1993, Information technology—Open Systems Interconnection—Systems management: Event Report Management Function.

ISO/IEC 10165-1:1993, Information technology—Open Systems Interconnection—Management Information Services—Structure of management information: Management Information Model.

ISO/IEC 9595:1998, Information technology—Open Systems Interconnection—Common management information service.

ISO/IEC 9596-2:1993, Information technology—Open Systems Interconnection—Common management information protocol: Protocol Implementation Conformance Statement (PICS) proforma.

ISO/IEC 7498-4:1989, Information processing systems—Open Systems Interconnection—Basic Reference Model—Part 4: Management framework.

Gilbert R., et al., CNMGRAF—Graphic Presentation Services for Network Management, ACM 0-89791-164 (1985).

M. Gargano, et al., A Logical Data Model for Integrated Geographical Databases, IEEE (1990).

Micromuse's Netcool/Omnibus, A Cool MOM Makes It Easy, Data Communications, Jan. 1995.

* cited by examiner

METHOD AND SYSTEM FOR EVENT IMPACT ANALYSIS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention relates to computer and telecommunication network monitoring and management and, more particularly, to methods and systems for correlating collected event data with administrators, management policies and procedures.

When most end users think about information technology (IT), they are more concerned with reliability and speed of the business critical services that IT delivers than the growing infrastructure that supports those services. Meanwhile, reliance on an ever-widening web of network, system, database and application resources makes these services even harder to manage.

With this critical reliance on the network, and the services provided, it is essential to pinpoint the probable cause of real or potential service delivery problems and resolve them quickly. To do this, administrators must first understand the entire infrastructure, the IT resources that support it, and how they work together to deliver services. Incoming events must be continuously sifted through to detect those affecting an enterprises ability to sustain service levels.

Improving service levels while reducing costs is every IT manager's goal, whether the service is being provided to an external subscriber or an internal end user within a corporate enterprise. The key to realizing these goals is optimizing processes and ensuring that policies are well planned and enforced.

In many organizations, the process of handling network and system faults is much less than one hundred percent efficient. Often, tangible economic benefits can be realized by simply automating the task of analyzing the impact of network faults on services, business units and customers. Further efficiencies can be achieved by optimizing policies for fault escalation and resolution.

Identifying and maintaining the following information is critical to maintaining acceptable network service levels:

1) What business processes are impacted by incoming faults?
2) How should work be prioritized and responsibility assigned for incoming faults?
3) What policies should be followed for resolving incoming faults?

Network access becomes increasingly critical to the performance and success of organizations. There is thus a need for a system for allowing network operators to quickly determine answers to the preceding three points.

BRIEF SUMMARY OF THE INVENTION

It is an object of the present invention to solve the problems described above associated with existing network management systems.

It is another object of the present invention to allow network administrators to quickly and correctly determine what users and business processes are impacted by incoming faults so as to minimize the impact to critical business processes.

It is another object of the present invention to allow administrators to determine how work should be prioritized and responsibility assigned for incoming faults.

It is another object of the present invention to determine what policies should be followed when resolving faults.

It is another object of the present invention to raise network service levels by reducing mean time to service restoration by automating escalation and response procedures.

It is another object of the present invention to enable organizations to leverage vital information scattered across disparate databases without going through a difficult process of co-locating databases or re-keying data into a common format.

It is another object of the present invention to enhance IT flexibility by allowing data to remain decentralized yet accessible from a central control point.

The above and other objects are achieved by an impact analysis software system residing on a computer connected to a network in an enterprise. The system analyzes the impact of network events on the network, and includes a number of modules, including a number of data source adapters for interfacing with external data sources to thereby allow access by the system to enterprise-related data in the external data sources. The system further includes an impact analysis data structure populated with data accessed from the external data sources and defining relationships between the enterprise-related data. One or more action tree data structures comprise a routine which, when executed, acts upon the relationships defined by the impact analysis data structure to handle events. A message processor reads the network events and select one of the action tree data structures to handle each read network event.

In some embodiments, the external data sources store data using a plurality of different formats, and the data source adapters comprise a data source adapter corresponding to each data source format. The system includes a selection routine for selecting one of the data source adapter corresponding to a given external data source.

As a result, the system and corresponding process leverages data presently stored throughout a corporate enterprise. The system utilizes the data source adapters to access a plurality of third party data sources including relational databases developed by Sybase Inc. and Oracle Inc., data sources accessed via the LDAP protocol, data stored in HTML or text format, etc. By creating and storing relationships among the disparate data sources, the system is able to effectively utilize existing corporate knowledge to achieve its goals. Moreover, the data utilized need not be kept in a proprietary form nor must it be administered from a central site. Local database administrators can continue to manage their data while it is simultaneously capitalized upon by the present invention to build relationships between systems, business units and users/administrators.

In some embodiments, the impact analysis data structure comprises a plurality of organizational nodes each representative of an enterprise element and populated with data accessed by the system through the use of the data source adapters, and one or more hierarchy structures of said organizational nodes, said hierarchy structures defining relationships of organizational nodes to one another by the data contained therein, said hierarchy structures representative of structures and business processes of the enterprise.

In some embodiments, the system further comprises an event handler to receive and queue data regarding network events from an event server. When an event arrives indicating, for example, that a router port is down, the system will determine the business unit associated with this port. It can then locate a list of people responsible for the router, scan the rotation to determine who is on call based on the current date and notify the party by e-mail, paging or other suitable method. If no response is received, the system automatically notifies the administrator's manager or the next person listed in the business unit's chain of command. Once the event is resolved, the system will halt the escalation.

Policies can be defined by associating documents of any type, e.g. text or HTML, with a particular component or a person who is responsible for resolving the problem encountered. Administrators can also examine policies related to specific events by simply selecting an event and requesting that the system send all documentation, users, and any other information associated with a particular event or class of events.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Preferred embodiments of the invention are now described with reference to the drawings in the Figures.

Figure 1:
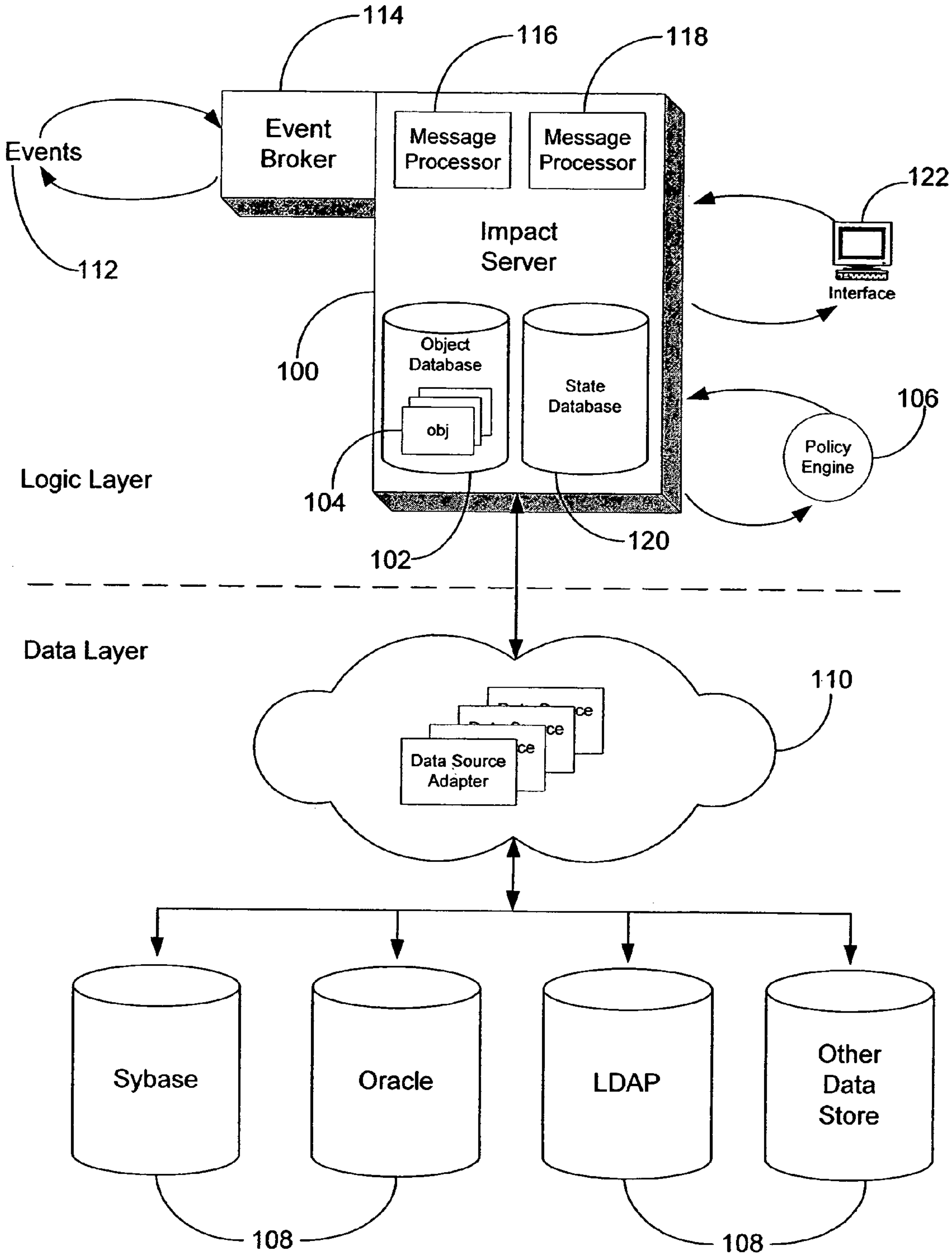
FIG. 1 is a block diagram of an exemplary system for assessing the impact of events and administering policies to achieve solutions in accordance with one embodiment of the present invention.

Referring to FIG. 1, in one embodiment of the present system, there is a strict separation of logic and data layers. Within the logic layer lies an impact server 100, which stores an object database 102. The object database contains a plurality of objects 104, referred to herein as Organizational Nodes or OrgNodes, which are used to define the organizational structure of an enterprise, such as hosts, communication devices, users, documents, etc., as well as the configuration information for the impact server itself The impact server 100 further contains a policy engine 106 used to execute action trees whereby the relationships exposed by organizational structure can be used to execute complex tasks in response to received events. The impact server 100 is controlled and administered by an administrator through a command interface 122. These components are included in what is referred to herein as the logic layer.

The functionality provided by the impact server is separate from the data layer. The data layer is comprised of the digital knowledge contained within an enterprise and the relationships within that knowledge. The data layer includes a number of data sources 108 having different formats or types and a set of data source adapters 110, each of which corresponds to one of the data source formats or types. Typically, organizations are divided into departments, with each department managing databases containing information regarding the department. Such information may include a database containing all the nodes in the department, the user name for each node and the date the node was last backed up. Another data source 108 within the department might be an LDAP directory server containing the names, e-mail addresses and pager numbers of each user in the department. This data can then be exposed to the logic layer by normalizing all data through the use of the data source adapters 110.

The data source adapters 110 are software interfaces that are used to access and expose relationships between a plurality of data sources 108 such as: relational databases developed by Sybase Inc. and Oracle Inc., data sources accessible via the LDAP protocol, data stored in HTML or ASCII text format, etc. Using the data source adapters 110, the manager of the impact server 100 need not learn any of the multiple query formats needed to access these different databases 108. Essentially, the data source adapters 110 render these data source differences invisible to the administrator and the system by handling the different methods needed to access the data and returning the data in a format understandable by the server.

Administrators need only input information to the impact server 100 which indicates where a particular data source 108 resides to expose the data contained in its tables. The impact server 100 then selects the appropriate data source adapter 110 which corresponds to the indicated data source 108, and the selected data source adapter handles the translation of the request and returns the data in a format usable by the impact server 100, thereby normalizing the data. Moreover, by allowing the data to be exposed without the need to administer each data source, the administrator is relieved of the burden of managing multiple data sources or having to rekey multiple data sources into a format understandable by the impact server; This structure allows the distributed maintenance of the system so that each manager is only responsible for managing the data sources in his or her area, thereby easily accessing and leveraging the knowledge contained in these distributed data sources. It is this exposed data and its inherent relationships that are used to generate the information contained in the OrgNodes 104, which are the objects that are used to model the organizational structure of the enterprise.

Figure 2:
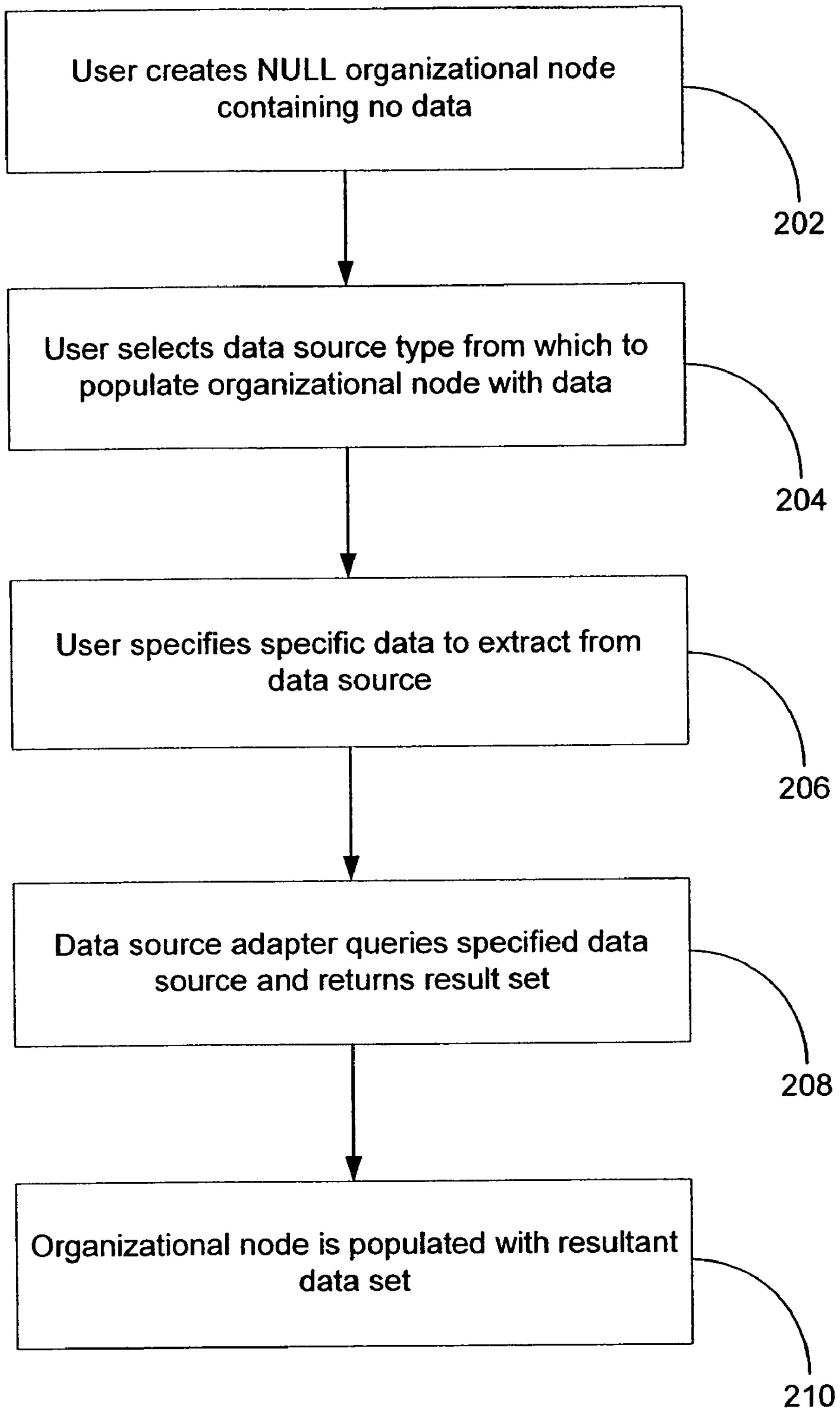
FIG. 2 is a flow chart showing an exemplary process of generating organizational nodes stored and used in the system of FIG. 1 in accordance with one embodiment of the present invention.

As stated above, OrgNodes 104 are objects used to model relationships that represent the organizational structure of the enterprise. The OrgNodes 104 can represent business units within the enterprise, network devices, applications, services, customers, users, and other relevant entities. For example, an object representing a node within a business department might be related to a group of user objects. Referring to FIG. 2, a system user first creates a new OrgNode that contains no data, step 202. The user next selects the data source from which data will be extracted, thereby populating the OrgNode with data, step 204. If the data source is divided into multiple parts, e.g., tables, the user may further specify the specific pieces of data to pull from the data source, step 206. The system then utilizes the appropriate data source adapter 110 which queries the data source and returns a result set, step 208. Data returned from the data source adapter is then used to populate the OrgNode with data, step 210.

Figure 3:
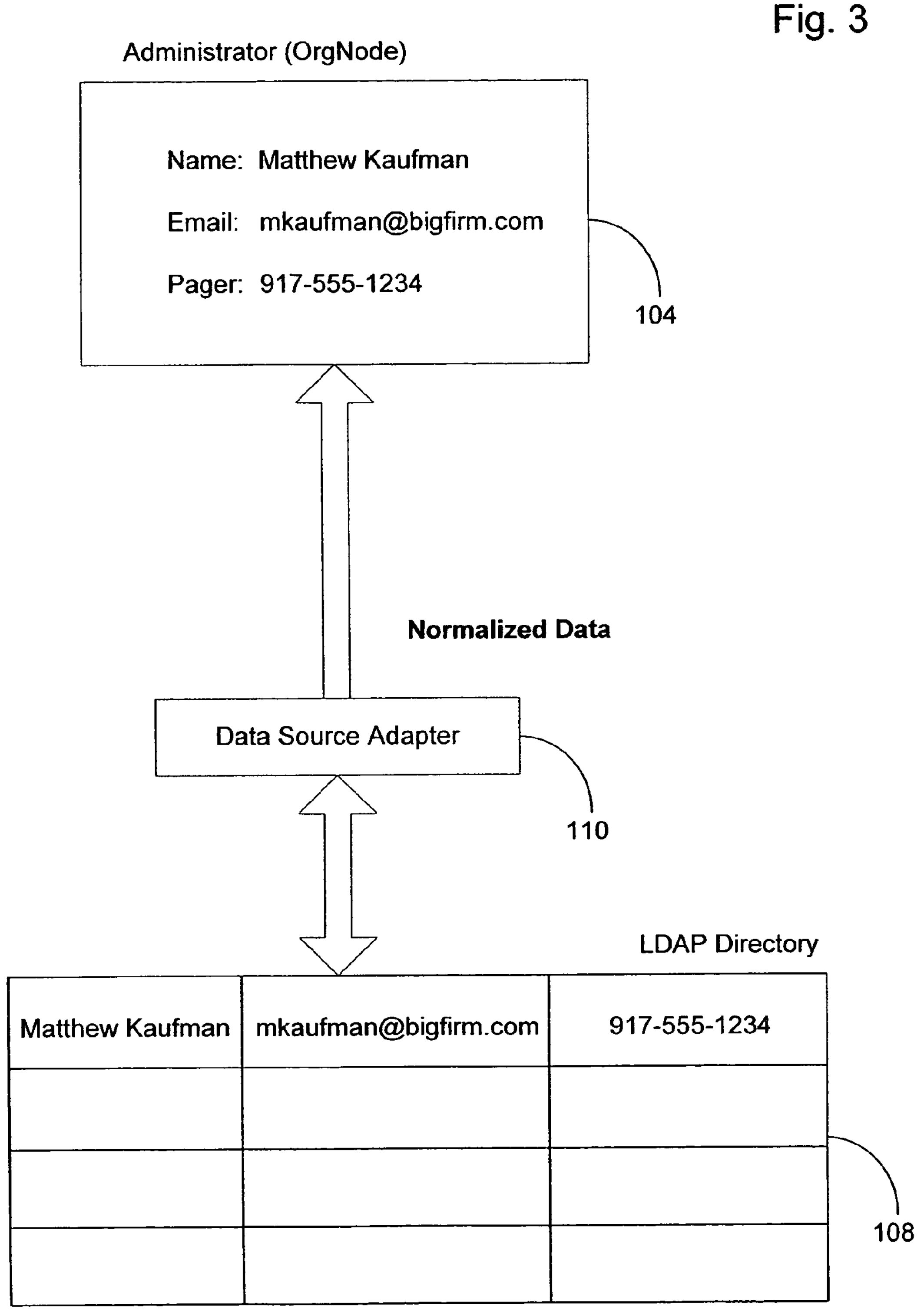
FIGS. 3 and 4 are flow diagrams showing exemplary conversions of data from a data source to an organizational node in accordance with one embodiment of the present invention.

OrgNodes 104 act in concert with the enterprise data exposed by the impact server through the use of the data source adapters 110. Referring to FIG. 3, an MIS department might have an LDAP directory 108 containing the names and e-mail addresses of all administrators in the department. An administrator wishing to create OrgNodes representing each administrator can transparently expose the data contained in the LDAP directory by the functionality provided by the data source adapters 110. This data is then used to create objects representing individual administrators 104, each object containing the administrator's name and e-mail address (or any other data exposed by the data source).

Figure 4:
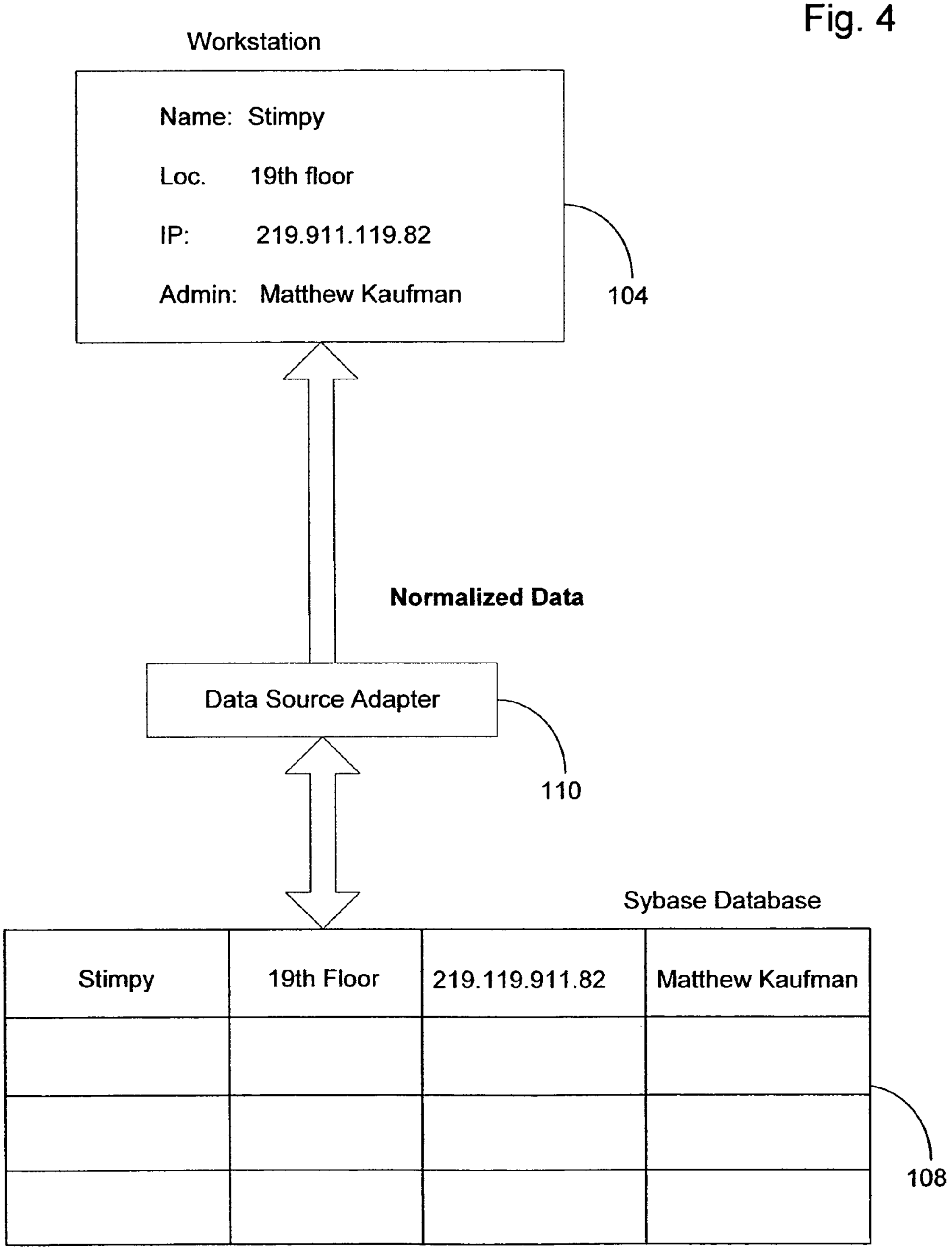

Similarly, referring to FIG. 4, a department might have a database 108 containing all the nodes in a business unit and the name of the administrator responsible for each node. Once again, using a data source adapter 110, the data contained in this data source can be used to populate objects representing all the nodes in a business unit 104. In this manner, administrators can define lists of users and hierarchies of business units, linking users to their respective business units.

Figure 5:
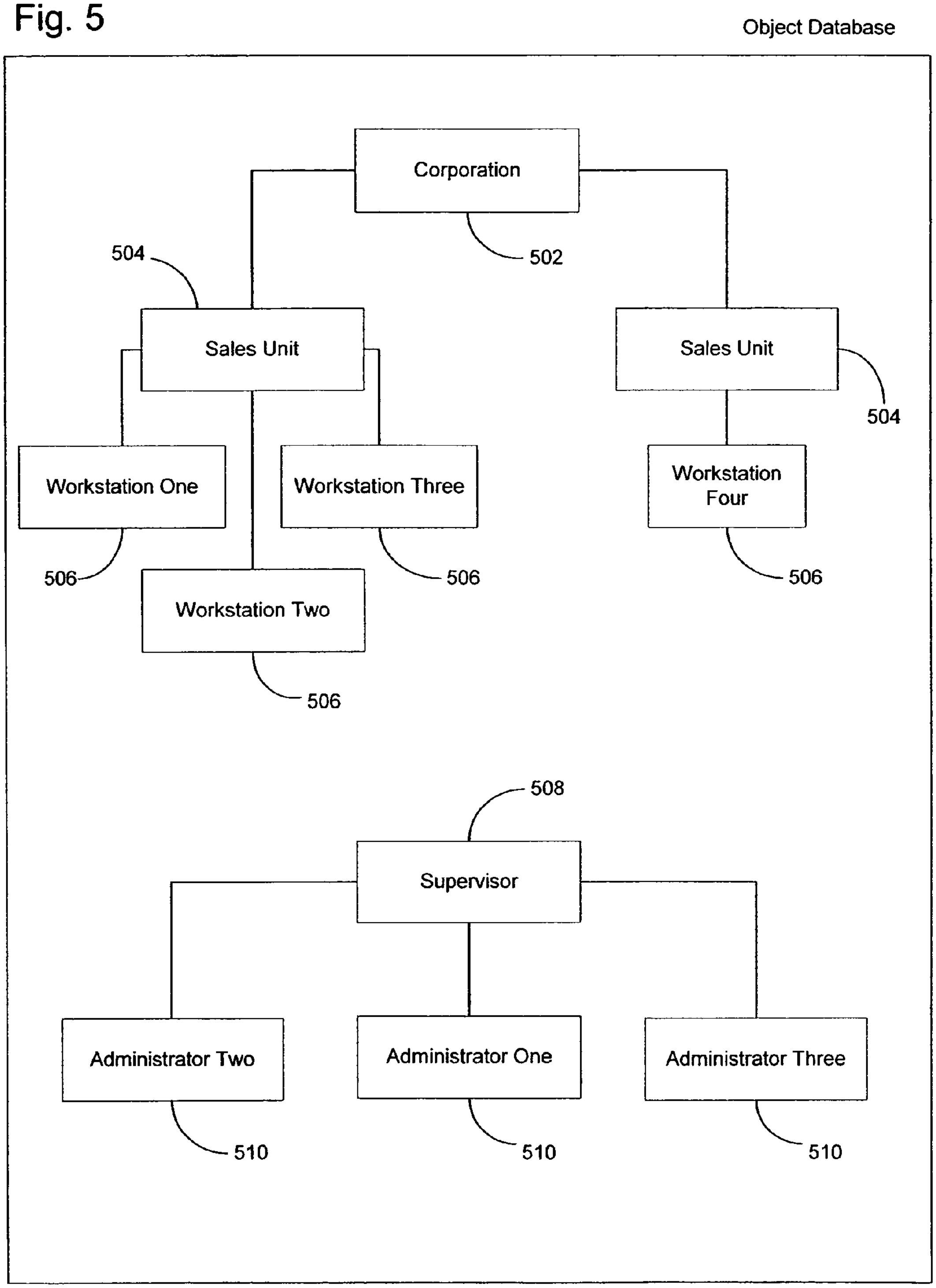
FIG. 5 is a diagram of a hierarchy structure of organizational nodes in accordance with one embodiment of the present invention.

There are many types of relationships between OrgNodes, for example, a child/parent relationship. Children allow OrgNodes to be arranged in a hierarchical manner, suitable for bubbling up through business departments or locations. These hierarchies of objects are stored in the object database 102. For example, referring to FIG. 5, a corporation 502 may be composed of multiple sales units 504. Each sales unit 504 may contain any number of workstations or other IT infrastructure objects 506. Similarly, an organization may contain a supervisor 508. The supervisor 508, in turn, can be in charge of any number of administrators 510.

Figure 6:
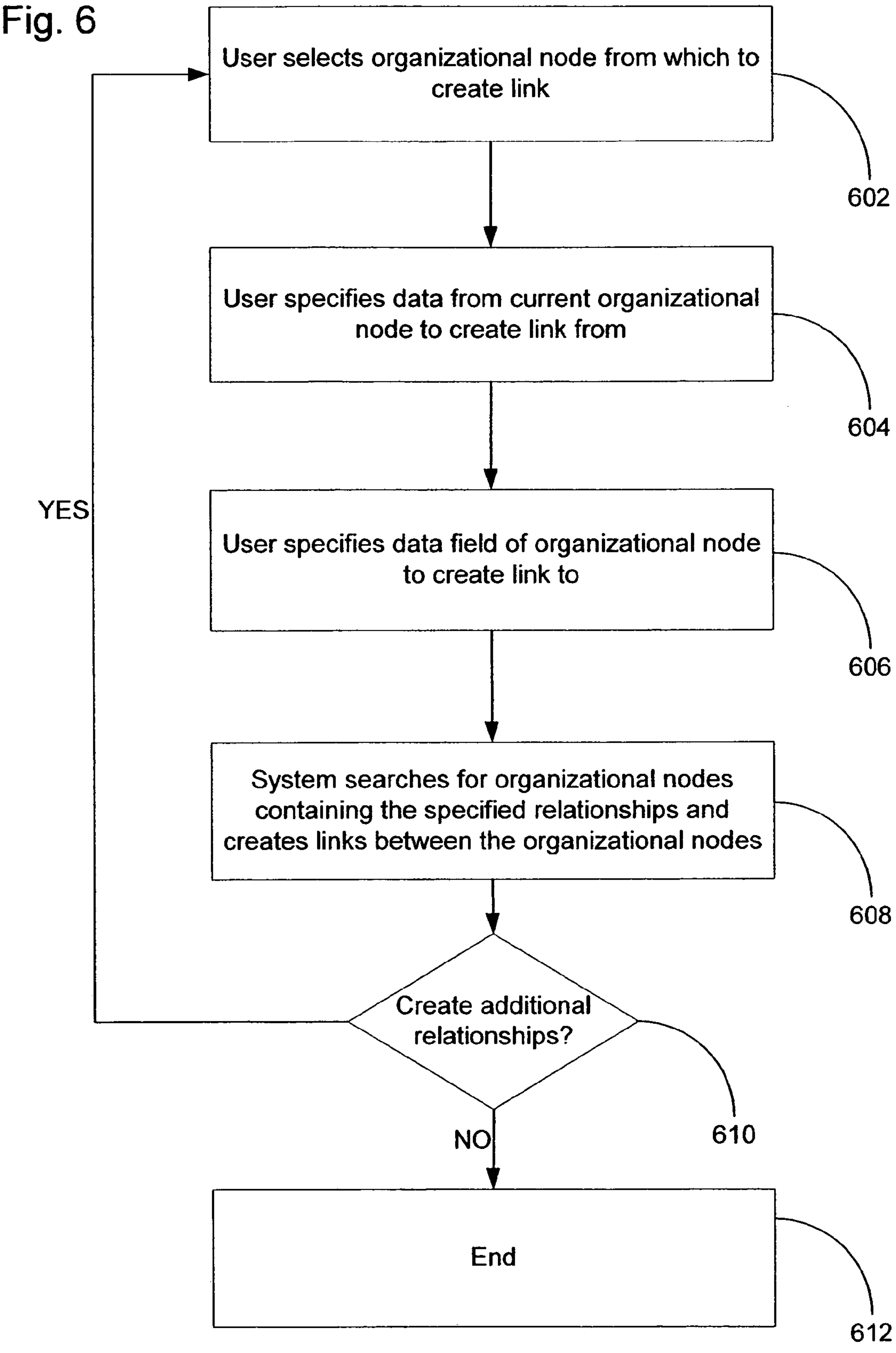
FIG. 6 is a flow chart showing a process of generating relationship between organizational nodes in accordance with one embodiment of the present invention.

Links allow for the arbitrary association of OrgNodes of different types. Referring to FIG. 6, a system user first selects an OrgNode to create a link from, step 602. The user will select a data field or fields from which to create the link, step 604. The user next specifies the data fields from the OrgNodes that the current OrgNode will link to, step 606. The system will then query all OrgNodes in the system and create a link between OrgNodes wherever the specified relationship exists, step 608. If the user requires additional links to be created between OrgNodes, the process is repeated, step 610, else the process of creating links is terminated, step 612.

Figure 7:
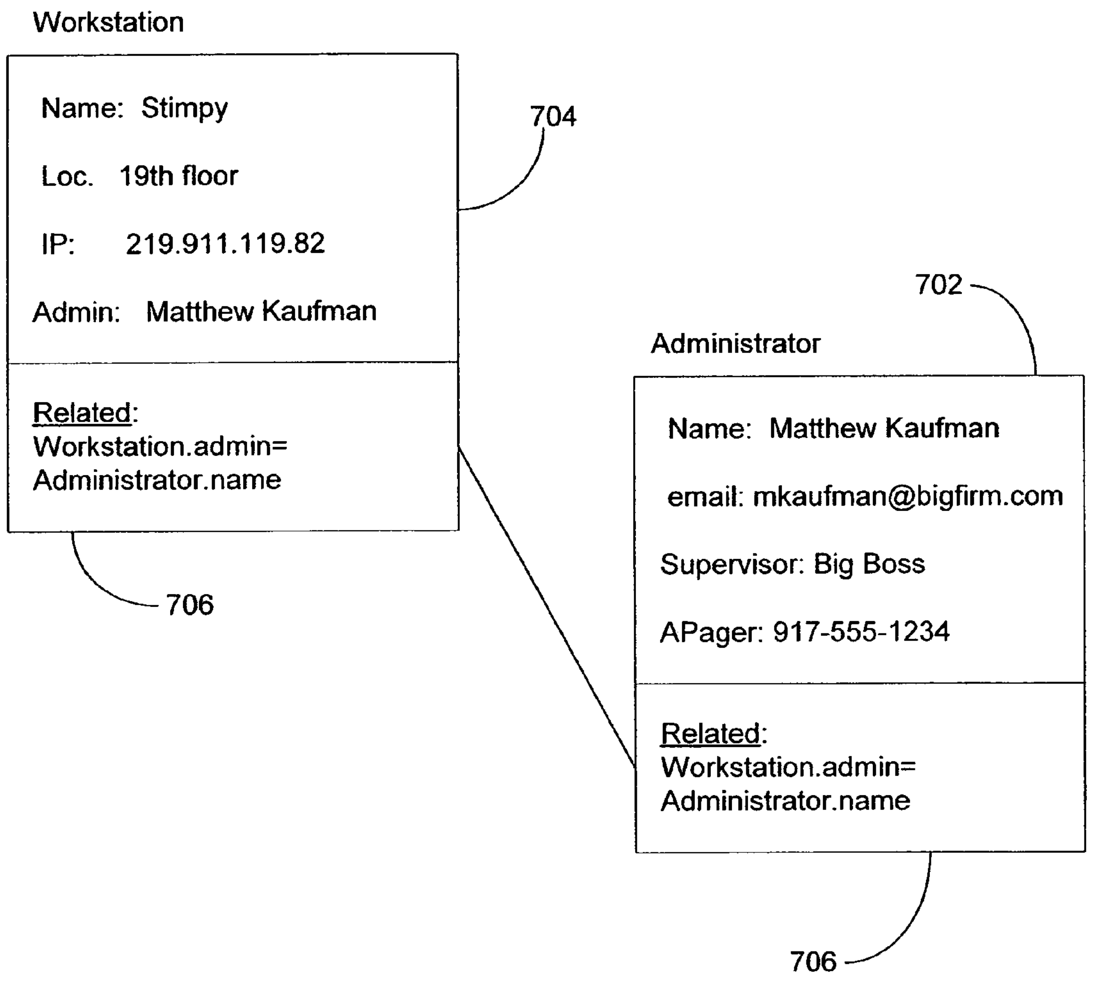
FIG. 7 is a diagram of a linking relationship between two organizational nodes in accordance with one embodiment of the present invention.

For instance, referring to FIG. 7, an administrator OrgNode 702 may be linked to a workstation OrgNode 704 in all places where the name contained in the administrator OrgNode matches the name of the administrator contained in the node OrgNode 706. The ability to place OrgNodes in hierarchical trees and link them provides a description of the business processes for a particular site. Linking various objects in the trees provides an infrastructure that allows the system to perform complex queries on the data objects.

Specialized OrgNodes, known as a Rota, can be created to represent the concept of a scheduled rotation. Any type of OrgNode can be used in a Rota, allowing a system operator to use Rotas to have a different user selected based on the time of day an event is received, as well as different documents or severities. For example, certain people may be responsible for a database service at different times of the day. In this case, a Rota of administrators would select the specific user on call at a particular time. Another example is a Rota of event severity. Some events may be regarded as extremely urgent during the weekdays but not as urgent at night or during the weekends. A Rota of event severity could adjust the severity of an event based on the time of day by querying data source that contains a time/severity matrix.

In one embodiment, the process of populating OrgNodes and identifying relationships between OrgNodes is performed on the fly, dynamically, as the OrgNodes are needed for processing by action trees, as described further below. A hierarchy structure of OrgNodes as described above is maintained in the impact server 100, and data is retrieved for the OrgNodes from data sources 108 using the respective data source adapters 110 as the OrgNodes are referenced in an action tree or policy which is executing. The data source adapters then retrieve data from the data sources to populate the OrgNodes. In this way, up-to-date information may be obtained from the data sources.

In addition, the data source adapters search for and retrieve relationship data from the data sources to use in the process of establishing relationships between OrgNodes. The data source adapters search for specific fields in each data type which may contain data which is used in establishing relationships. For example, a data source adapter retrieving data about a workstation or node searches for an administrator identifier field in the data source, and, if one is found, retrieves the information contained therein. This data is then used by the impact server to identify one or more administrator OrgNodes and automatically establish links between the two OrgNodes. If such data is missing from the data sources, a user may input it directly into the impact server, as described above. As a result, users wishing to make changes to the organizational scheme need only update the data in the data sources, and this updated data is automatically and dynamically captured by the impact server using the data source adapters.

Figure 8:
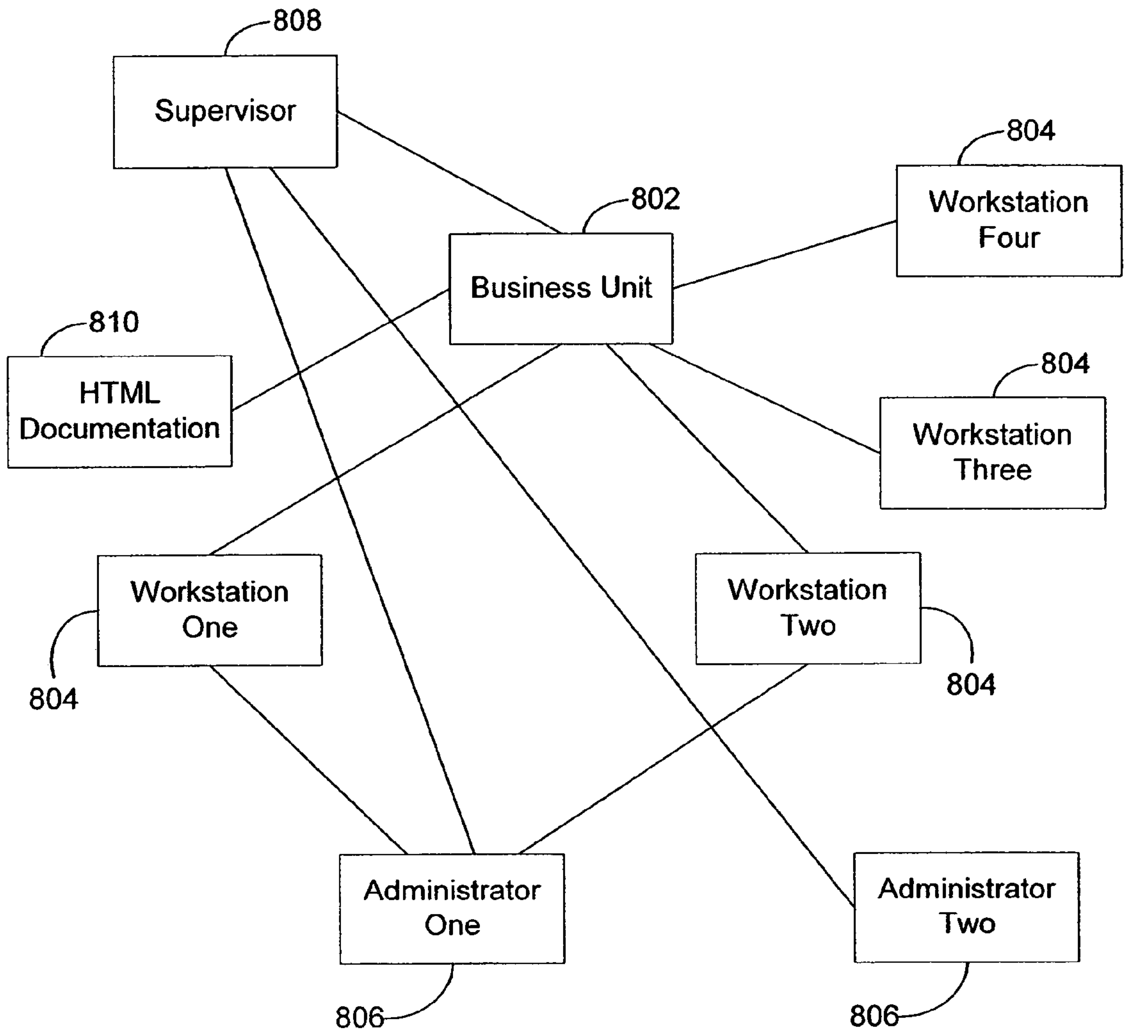
FIG. 8 is a diagram showing relationships among a number of organizational nodes in various hierarchy structures in accordance with one embodiment of the present invention.

The relationships created between OrgNodes may be viewed graphically by the impact server administrator. Referring to FIG. 8, a business unit in an enterprise 802 may be linked to all of the workstations 804 contained in the business unit. Relationships between workstations and administrators 806 will also be exposed. Furthermore, relationships between a business unit's supervisor 808 and any documentation 810 regarding the unit's operational policies will also become apparent.

Referring again to FIG. 1, events 112 are collected by from any number of commercially available event servers. The system is connected to the event server's database by way of an event feed. This connection is used by the impact server's event broker 114 to poll the event database for new events. The event broker 114 is a module that provides for real time event processing. As new events are read, they are placed into a buffer and read one at a time.

All incoming messages are place in a queue to be acted upon by a message processor 116, which is another component of the impact server 100. For each message read from the queue, the message processor 116 executes the proper action tree on the event contained within the message. The type of event determines what should be done with the incoming event, e.g., an incoming e-mail and a fault notification are both incoming events, but different processes are performed on them. The message processor 116 then spawns the appropriate action tree, described in greater detail below.

Multiple message processors 116 and 118 can be utilized in one embodiment of the invention, with each running in its own thread. Alternatively, each message processor 116 and 118 can run on a different machine, simultaneously processing events. Since each message processor 116 and 118 opens its own connection to the event broker 114, it does not impose extra load on a single impact server.

The processes of impact analysis, response and prioritization and policy management are implemented by using action trees. Action trees are a policy data structure for handling events and operator requests. Action trees are comprised of action nodes, which are objects and a specialized type of OrgNode. Action nodes can thus be linked to each other and viewed since node branches are exposed as parents and children. Action nodes comprise a collection of actions and decision branches. Action trees can precisely mirror an organization's structure by defining intricate relationships between business processes, employee schedules and network infrastructure. This functionality is achieved by utilizing the data and relationships exposed by the data source adapters and modeled by OrgNodes.

Action trees also have the capability to return events to the event server being polled by the impact server, making the event more meaningful to the event server operator and, as a result, speeds up the process of fault resolution. An example of this might be to replace IP addresses with host names or to set the severity level of the event to a particular level based on the time the event occurred.

Figure 9:
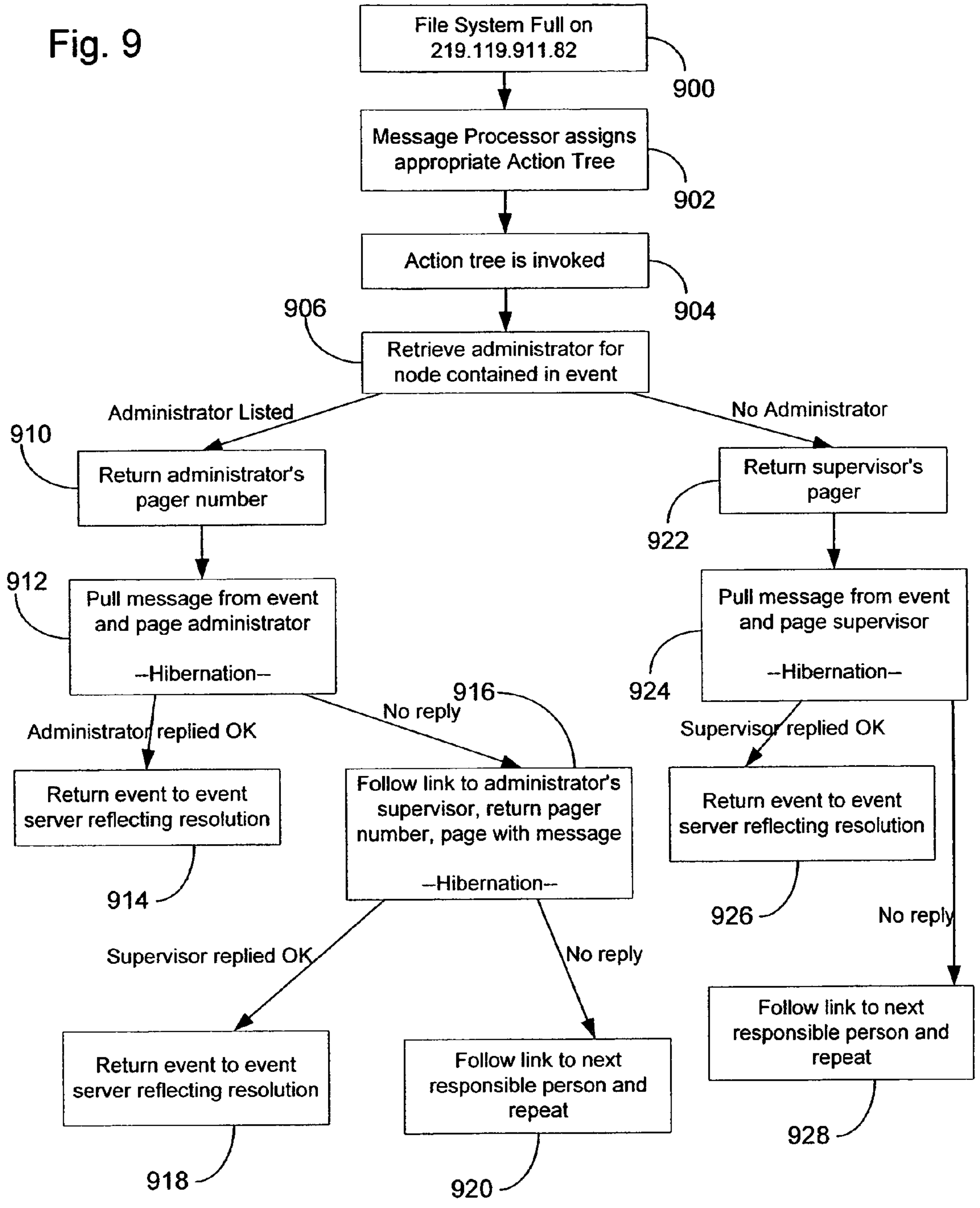
FIG. 9 is a flow chart showing an exemplary process of propagating impact decisions among a organizational node hierarchy in accordance with one embodiment of the present invention.
Figure 10:
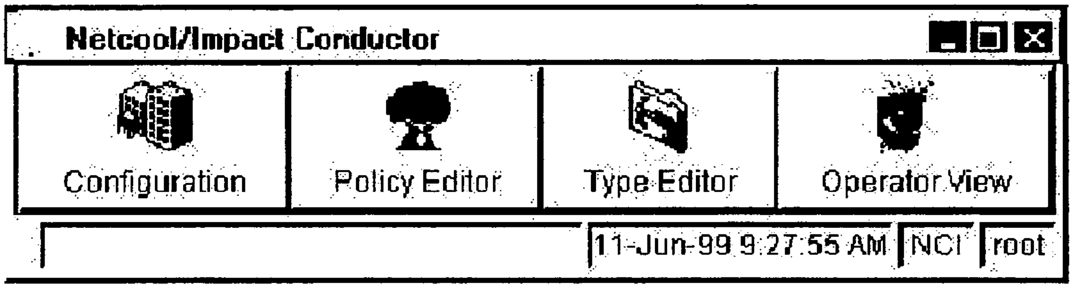
FIGS. 10-15 show exemplary screen displays generated by a software system implementing one embodiment of the present invention.

A more complex action tree might go through the following steps. Referring to FIG. 9, an event is received, step 900, from the event server stating that the node at IP address 219.119.911.82 has a file system that is out of free space. The appropriate Action Tree is located by the Message Processor, step 902. The Action Tree is then invoked, step 904, by executing the root Action Node in the tree. The Tree will look up the OrgNode representing address 219.119.911.82 and follow the link to the OrgNode representing the node's administrator, step 906. If the OrgNode representing 219.119.911.82 has administrator data, the appropriate administrator object is then queried for needed information, such as the administrator's e-mail address or pager number, step 910. The system then pages the appropriate administrator and goes into a hibernation state (see below) to await the administrator's response, step 912. If the administrator responds that the event has been resolved, the Action Tree reawakens, the event is modified to reflect the resolution and passed back to the event server, step 914.

If the event is not resolved, e.g., the wake up period has lapsed, the Action Tree can escalate the event by following the link from the administrator OrgNode to the OrgNode representing the administrator's supervisor, step 916. This object is then queried to determine the supervisor's pager number, etc., step 916 and dispatches a messages at which point the Action Tree goes into hibernation while awaiting a response. If the supervisor responds that the event has been resolved, the Action Tree reawakens, the event is modified to reflect the resolution and passed back to the event server, step 918. If the supervisor fails to respond, this escalation process will continue until the event is resolved, step 920.

Returning to step 906, if no administrator is contained in the OrgNode representing the object broadcasting the event, the tree will look up the OrgNode representing address 219.119.911.82 and follow the link to the OrgNode representing the business unit's supervisor and return his or her contact information, e.g., pager number, step 922. As above, the message will be parsed from the event and sent to the supervisor as a message, at which point the Action Tree will go into hibernation, step 924. If the supervisor responds that the event has been resolved, the Action Tree reawakens, the event is modified to reflect the resolution and passed back to the Event Server, step 926. If the event is not resolved, i.e., the wake up period has lapsed, the Action Tree can escalate the event by following the link from the supervisor's OrgNode to the OrgNode representing the next responsible person in the chain of authority, step 928.

In addition to utilizing data embodied by OrgNodes to handle event resolution, Action Trees call and execute external scripts. Scripts can reside on any host within the enterprise and be located on the system hosting the impact server. Because of this, scripts can be written in virtually any scripting language supported by the various hosts. As can be appreciated by one skilled in the art, this functionality gives the impact server unmatched flexibility to automate the event resolution process and cure system faults with speeds that were unattainable using existing systems.

Action Trees can also be utilized to auto-populate, or substitute, fields in received events that are otherwise incomplete. When the impact server attempts to act upon an event, it will first determine whether data is missing from any field in which searches for data. If it is determined that data is missing and an event is thus incomplete, the Action Tree is used to query the appropriate data source to locate missing information. The retrieved information is added to complete the event. The now complete event is then sent back to the event server. For example, a network service provider maintains a database of how circuits map to specific customers. At times, events are received in which the customer field is blank. Using the "Circuit ID" as a key field, the impact server can query the database, add the customer information field into the event, and send the complete event back to the event server.

As mentioned above, another feature of the present invention is the ability to put Action Trees into a hibernation state. When hibernation is triggered, a process saves the state of the currently executing Action Tree to a state database 120 (FIG. 1) contained within the impact server 100 and stops execution, resulting in a sleep state or "hibernation". Data saved in the database includes, but is not limited to, the reason for hibernation and a reawaken time. An escalation service runs periodically to instruct the state database 120 to reawaken any sleeping Action Trees whose wakeup time has passed, thereby resulting in processing continuing at the node that was executing when the Action Tree was put to sleep.

A hibernating Action Tree can also be woken up by receiving a wakeup call message. E-mail or other messages sent to the system are parsed and placed in a data structure to determine exactly which hibernating action tree to awaken. This data structure also stores parsed information regarding how to handle the next step in the Action Tree, allowing the Action Tree being woken up to branch based on data from the received message. A typical application of this ability would be to parse the e-mail received and acknowledge the event resolution if the user replied "OK" or to escalate the event if the user replied "ESCALATE".

Using the ability to return modified events to the event server, thereby updating information contained in the event database, and Hibernate to save state, very powerful workflow or problem management applications can be built that are tightly integrated with the event server.

According to the above description, the present invention enables service providers to improve service levels while reducing costs by automating the process of impact analysis, event escalation and fault resolution. The process is optimized by building a bridge between real time network fault/event feeds and relevant information stored throughout the organization. This is accomplished by linking different data sources to define relationships and enforce policies, thereby separating data from the processes to be performed upon it and freeing the administrator from the complex and time consuming task of managing a potentially tremendous variety of data stores to expand on the generated event data.

Figure 11:
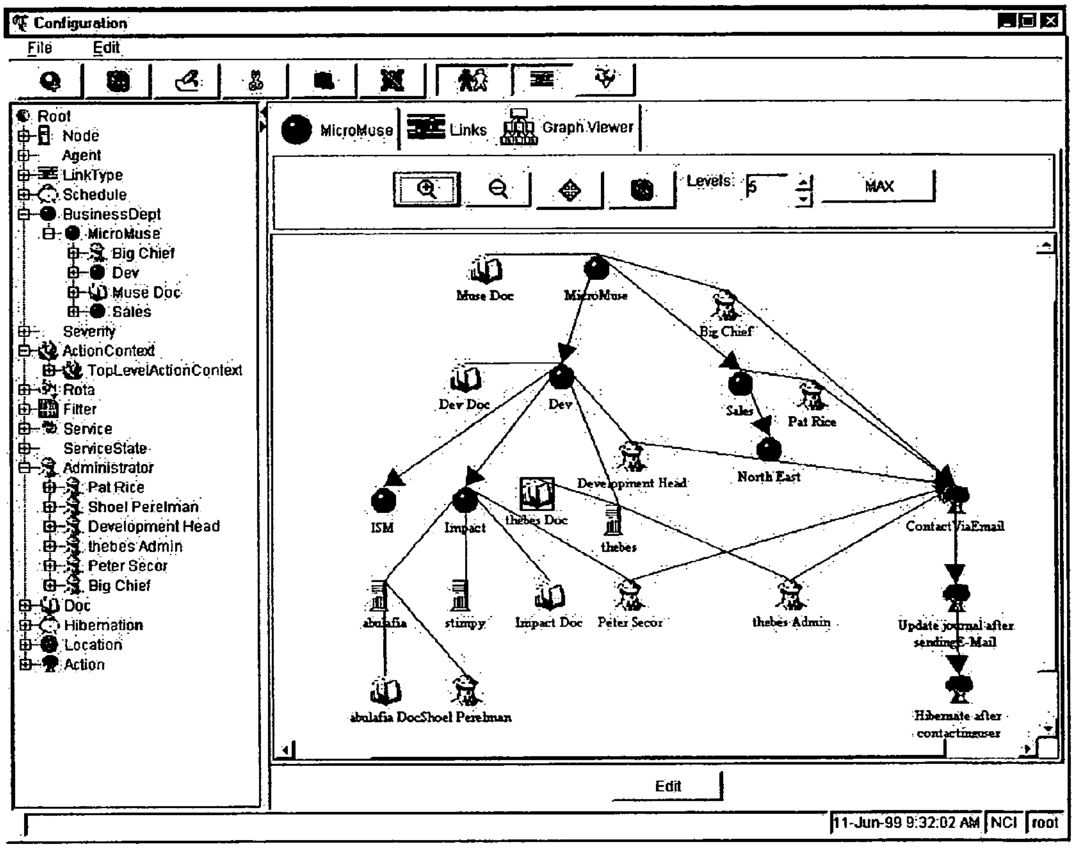

FIGS. 10-15 are screen displays generated by one embodiment of the invention and displayed on the command interface 122 (FIG. 1) to the impact server 100. In the display shown in FIG. 10, an administrator is presented with four types of functional modules—configuration, policy editor, type editor and operator view. A screen display from the configuration function is shown in FIG. 11. This display shows an organizational hierarchy structure with OrgNodes for administrators (e.g., PAT RICE, DEVELOPMENT HEAD, THEBES ADMIN), business units or departments (e.g., DEV, SALES), nodes or workstations (e.g., STIMPY, ABULAFIA), action nodes (e.g., CONTACT VIA EMAIL, HIBERNATE AFTER CONTACTING USER), and other OrgNodes. The OrgNodes are visually arranged showing their relationships, with, for example, business departments shown linked to administrators and workstations, and administrators linked to action nodes which contain processes for implementing policies for contact the administrators. Action nodes are linked to form action trees. Users can interact with this screen display to edit the OrgNodes relationships.

Figure 12:
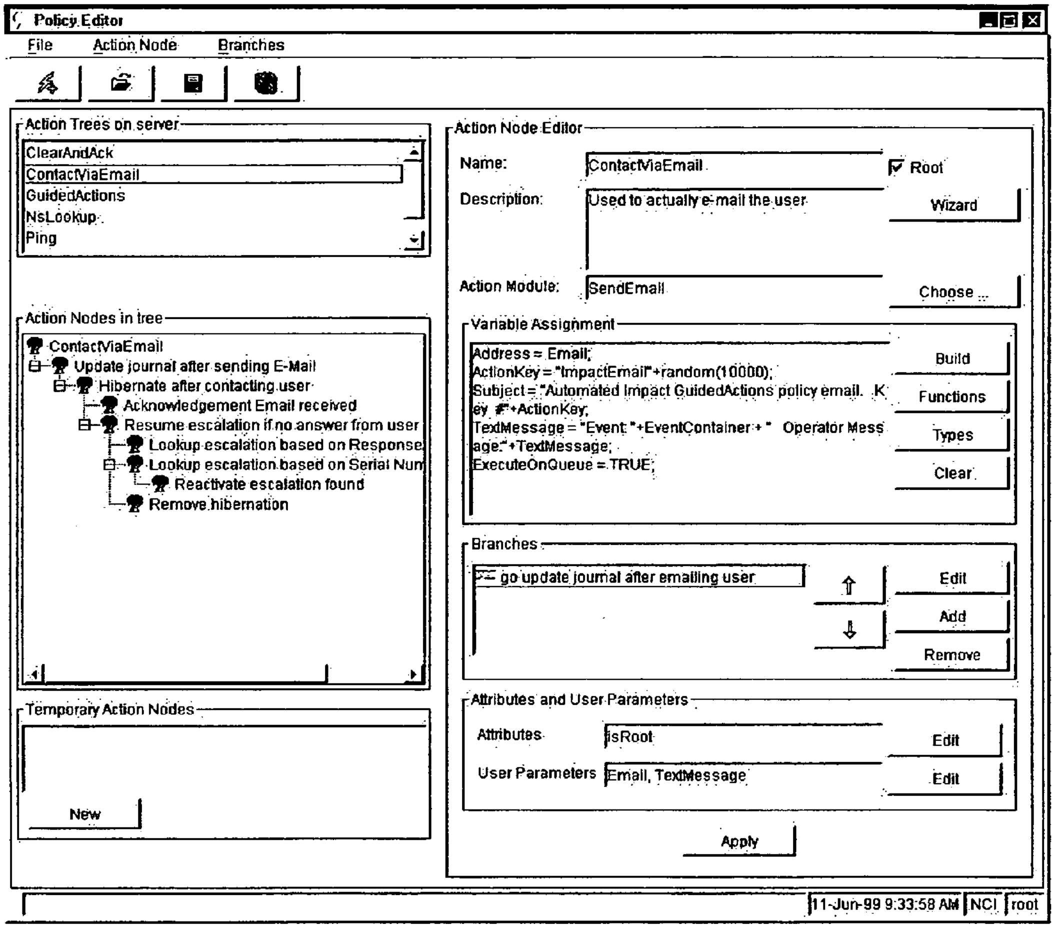

Action tree and node objects and accompanying policies are edited through the exemplary screen display shown in FIG. 12. The ACTION NODES IN TREE dialog in the display shows the various action nodes contained within the tree CONTACT VIA EMAIL and their hierarchical relationship. The ACTION NODE EDITOR dialog allows the user to input and modify aspects of the nodes, including the variables and functions in the node.

Figure 13:
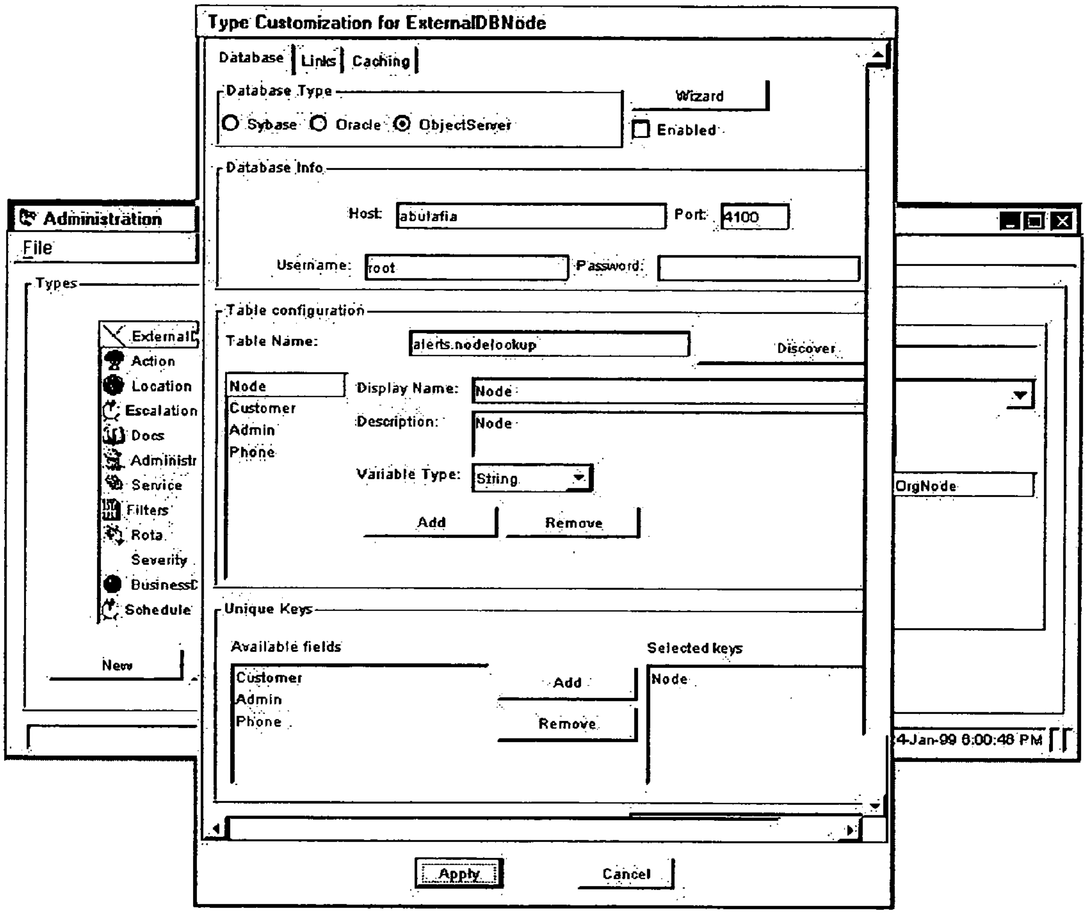
Figure 14:
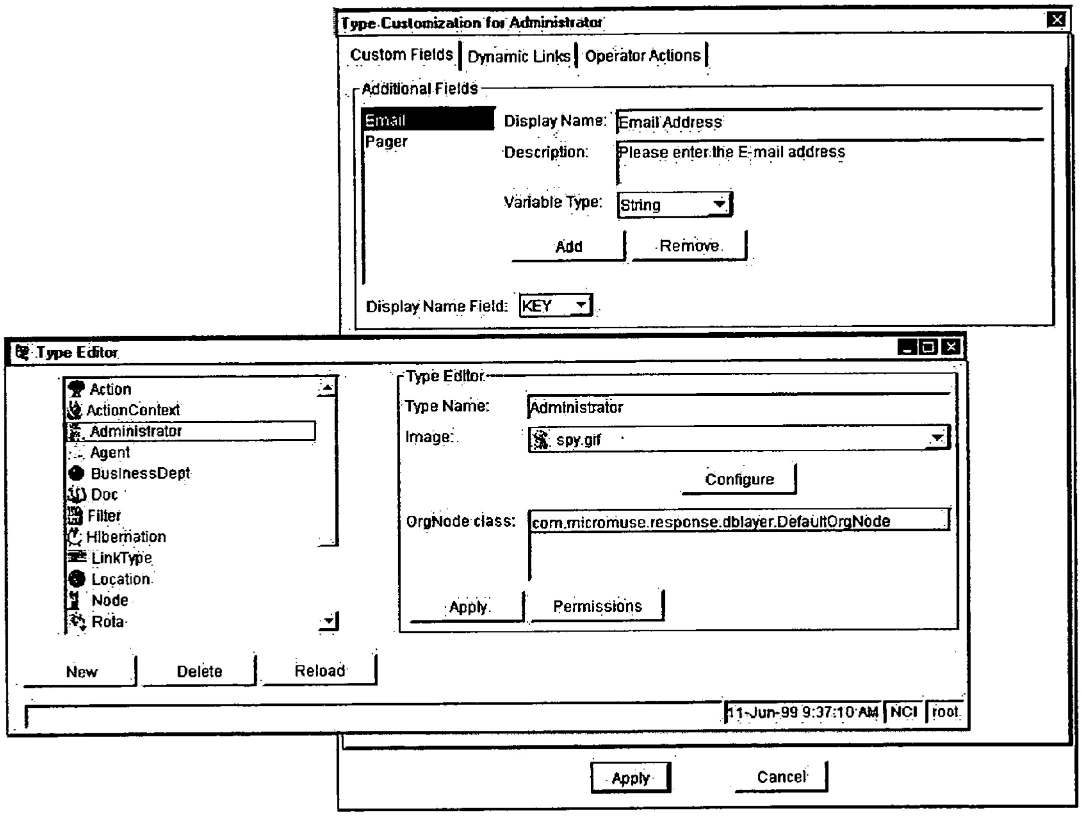

Users can input and modify data types through the exemplary screen displays shown in FIGS. 13-14. FIG. 13 shows a dialog for editing parameters of a node from which data is retrieved and FIG. 14 shows a dialog for editing parameters of an administrator data type.

Figure 15:
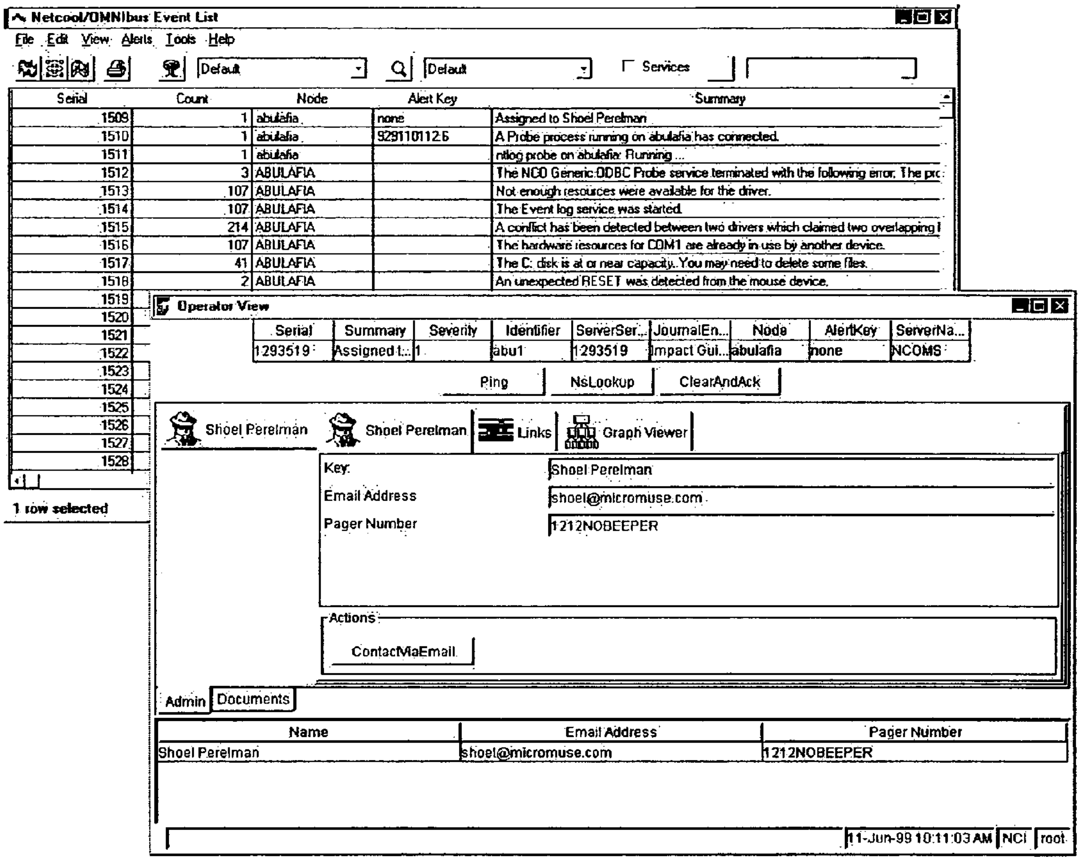

Finally, FIG. 15 shows an exemplary screen display for allowing a network operator to view the status of various network events. The events are listed in a grid, which includes a field called "Summary" for displaying the nature of the event. An operator view dialog shows data from the administrator OrgNode(s) linked to the node affected by each event, and the data in that OrgNode as retrieved from a data source using a data source adapter, as described herein.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The following Appendix contains a listing of classes and an exemplary language which can be used to implement one embodiment of an impact server and supporting services as described above. Reference in the Appendix to "Response" refer to an embodiment of the impact server as described herein.

APPENDIX

Response Data

There are three main types of data storage in Response.

a) System configuration this pertains to which services, actions and types are available and configured. The service manager maintains a repository of services that have been installed as well as which ones should be started automatically when the system is started. Currently, this data is only stored in the ODI Object database, although configuration for each service is stored in ASCHI property files.

b) OrgNodes OrgNode data consists of all the static data that is accessed by Response as it is performing its processing. Strictly speaking, OrgNodes aren't really static, as they may be updated by other servers or services as Response is running, but I refer to them as static data in contrast with state data, which is constantly being changed as a matter of course. Examples of OrgNode data are the Administrators that may be contacted, the business department hierarchy, lists of nodes and documentation. Links between these objects are also considered to be OrgNode data. Action Trees are also currently stored in ODI.

OrgNode data may reside in any database as will be discussed in the section regarding OrgNodes and Types. However, at the highest level, there is a root from which all OrgNode data can be navigated to. This root is stored in ODI. Although all OrgNode data could be stored in external databases, there are some types that are particularly well suited for storage in an Object Database such as ODI. An example of such an object is a Rota, which has three levels of containment, and would therefore take more effort to store in a relational database.

c) State data Data that is added and updated during the regular course of the execution of Response (by an Action Tree) is stored in a separate database file, although it is also an ODI database. It is kept separate so the state of the Response system can be reset simply by deleting the state database, while the static OrgNode data and configuration data can be left untouched. There may be references from the state database into the OrgNode database, although not vice-versa, since the state database may be reset at any time.

Examples of state data are escalations in progress, which technically are action trees that have been saved to the database at a point during their life cycle. They can be resumed later as will be discussed in the section regarding Action Trees.

Transactions/RespDatabase: The db package The transaction model and interfaces to ODI are abstracted into two classes, albeit some minor exceptions apply. db.RespDatabase The RespDatabase class provides methods that proxy to the ODI database. It provides services such as openDatabase( ), startTransaction( ), endTransaction( ), lookupRoot( ), and bindRoot( ). While the purpose of the first three functions can correctly inferred from their name, the last two are specific to object databases. In an Object Database, all objects can be navigated to from a few roots. These roots are bound to names and are looked up when the applications needs them. This abstraction was written as an insulation from ODI's API. It has already been useful as Response was migrated to use ODI from POET, which it used for the first three months of its development. Unfortunately, it has proven necessary to make some ODI specific method calls elsewhere in the application, although their functions are usually tweaks such as to ensure an object has been fully loaded from the database before being serialized. If ODI were removed, the tweaks could be removed if the new data storage layer didn't required them.

db.TransactionManager TransactionManager provides all transaction control for the entire Response application. No application code ever explicitly beings or ends transactions. Rather, it pass instances of the TransBlock class to the TransactionManager, which they queues them up and executes each one as a separate transaction. This ensures no two threads attempt to access the database at once.

ODI OSJI

Currently, we are using ODI's OSJI product (Object Store Java Interface). OSJI is a java binding to the ObjectStore database, where data actually resides. OSJI, through the use of a post-compiler, adds code to persistent classes that causes them to be automatically fetched and saved to the database. This allows developers to write their application without even taking in to account how data will be stored. This means no calls are ever made to the database except for looking up top level roots and for transactions. OSJ1 has allowed us to create our class designs without being constrained by what maps easily to tables and columns. This has allowed us to use object oriented design patterns such as the COMPOSITE pattern and multiple levels of containment without worrying about how difficult they may be to store in an RDBMS model.

Additionally, we didn't have to spend development effort on implementing a caching scheme, as OSJI has a C++ layer which takes care of moving the necessary data between the ObjectStore server and local memory quickly, as well as providing invisible caching of the data. OSJI accomplishes this by marking objects that have been modified and automatically writing the changes to the database when the transaction ends. If no changes are made in a given transaction, no database traffic is incurred and the process runs as if it were entirely in memory. For reading data, OSJI pulls the necessary data into memory whenever a pointer is referenced. Only the instance variables of a class that are actually referenced are paged into memory.

One shortcoming of OSJI is that it doesn't allow different threads in an application to have their own transactions. Instead, there is only one transaction for the entire application, which requires the application to ensure that one thread won't commit the global transaction while another thread is using the database. ODI's PSE Pro does support multiple transactions (they refer to this as multiple Sessions), although it doesn't have the came scalability and client/server model.

To deal with OSJI's absence of support for multiple sessions, the TransactionManager's commit ( ) method is a synchronized method. To allow multiple clients to access the database simultaneously, we could replace ODI OSJI with another database which supports multiple sessions and remove the synchronized keyword. Whenever a discussion of threads is made, it is assumed that any thread that needs to access the database must wait in queue for the TransactionManager.

TransactionManager provides the facility to register post-commit blocks. These are TransBlocks that will be executed after a transaction is committed. The facility provides a way for data stores besides ODI to commit any changes that may have been made to objects they should be storing.

db.TransBlock The TransBlock class is similar to the Runnable interface, in that its sole purpose is to provide a doit ( ) method in which the actual code to be executed during the transaction can be specified. To execute code atomically in a transaction, simply subclass TransBlock and override the doit ( ) method with the code to be executed. Then, make a static call to TransactionManager.commit( ) as such:

```
TransactionManager.commit (new TransBlock ( ) {
    public void doit ( ) throws Exception {
        // code here is atomically committed
    }
    }
```

For more details, see the javadoc entry for the db package. The server.Facade class has many examples of transactions. This will be discussed in a later section.

Communications Layer—RMI was chosen as the communications protocol since it insulates developers from having to worry about issues such as how to marshall data across the wire. One of the design goals of Response was to allow applications written upon it to communicate with their GUIs and other Response subsystems running in other processes without having to design special protocols for each such instance. Since it is closely integrated with java, RMI makes this goal a reality as we were able to design the GUI to interact with subsystems in the server just as if the system was running in the same process. The same is true for subsystems. As will be elaborated on later, Response subsystems can find each other and work together even if they are running in separate processes or on other machines.

There are a few special classes that facilitate the creation of active GUIs such as the ORBPublisher/ORBSubscriber classes. These provide a mechanism for a response subsystem to stream updates to a subscriber (located in a client) without the subsystem having to wait for the client to receive the updates. It is done using a producer/consumer pattern in which the subsystem sends its updates to an ORBPublisher, which places the updates in a queue. Another thread picks up these updates, called Notifications and multicasts them to each of the subscribers. Since this activity takes place in another thread, the subsystem does not stop processing if problems arise when sending the updates. Additionally, ORBPublisher provides us with a centralized place to integrate new update schemes such as true IP based multicast when them become available. Work in these areas is already being done by Sun in some of their distributed computing projects such as JavaSpaces.

Another feature of ORBPublisher is its ability to have subscriber updates "fan-out". ORBPublisher supports a multi-tiered publish/subscribe model through the use of proxy publishers. If multiple clients subscribe to the same type of updates, the service providing the updates only receives one subscription request. The updates are multicasted by ORBPublisher. This is used by ORBClient and OREServer. A service running within response can register itself with ORBServer by calling ORBServer.addProxyPublisher( ). The service registers itself with a name such as "OrgNodeUpdatePublisher". When a process within the client needs to subscribe to a service, it calls ORBClient.addSubscriber (serviceName, subscriptionInfo). ORBClient then subscribes to the specified service name by making a call to ORBServer.addSubscriber (serviceName, subscriptionInfo). If 5 client side components (for example, 5 views of the same dynamic data) subscribe to the same service, the service will only send one update to the client's ORBClient, which will then send the 5 updates out to the 5 components in the client.

The subscriptionInfo field is in instance of the common.SubscriptionInfo class which is used to uniquely identify which type of updates the subscriber would like to receive from the publisher service. For example, if the service was "SportScoreTicker", a client may only want to receive sports score updates for the "Mets" team. Therefore, the subscriber would use the method call publisher.addSubscriber (subscriber, new SubscriptionInfo ("SportsScoreTicker", "Mets")). This allows subscribers to only receive the particular type of updates they require. It is important that the uniqueness identifier object (the "Mets" object) must always return the same hashcode and its equals ( ) method must return true for two instances of the same uniqueness identifier. In other words, instances of the uniqueness identifier should base their equals ( ) and hashCode ( ) methods on content, and not on identity.

The SLAM service uses ORBPublisher with SubscriptionInfos to propagate service level changes to clients. The SubscriptionInfo's identity is based on a combination of a TimeWindow and a ServiceLevelProjector. This allows each SLAM GUI service level table to only receive updates that it needs to display. See the SLAM document for more information.

Session Layer

Response is built upon a 3 tier architecture, although it can be collapsed into two for special applications that require extra speed. Each client has a session created for it by the ResponseServer. Therefore, there is no synchronization required at the session layer since each client can be sure it will be the only one using its session. Any synchronization is done at the lowest possible layer. For each session, an instance of ORBServer is instantiated by ResponseServer. OREServer is an RMI remote class which is accessed by ORBClient on the client side. The gui makes static calls to ORBClient, which contacts ResponseServer, which instantiates ORBServer and returns an instance of SessionReference to ORBClient. SessionReference contains a remote reference to an ORBServer and an instance of PrefsUser, which is an instance of the User that has logged in. PrefsUser will be discussed in the section about authentication.

ORBServer creates an instance of Facade, which is the transaction layer and single interface to the entire Response system. Any application that wishes to interact with Response can accomplish what it needs to do through Facade (see section on Services).

Facade provides a set of high level access methods into the system and takes care of transforming internal datastructures into external ones that can be passed back to a client application. It also wraps all method calls into the Response server in TransBlocks and has them executed by TransactionManager. Therefore, when designing modules that work with Response, it is usually not necessary to get involved with Transactional issues. However, this is not true for services that modify the state database. These specialized applications must wrap their transactions in TransBlocks and pass them to TransactionManager.

Any java application can use ORBClient. The GUI just happens to be one application that uses it. Certain subsystems within the Response server use ORBClient as well when they need access to some of the high level services it provides. There is no RMI inefficiency incurred when this happens as ORBClient will recognize that it is running in the same VM as Facade and use it directly, bypassing the ORBServer class. This is how the 3-tier architecture can collapse into 2-tier when necessary. Another use for this feature is to write auto population agents that need to insert vast amounts of data into the system quickly. Instead of connecting as a remote process via RMI, the agent can instantiate the response server before ORBClient and ORBClient will know that it should directly instantiate its own instance of Facade and use it.

Caching is another function performed by ORBClient. The retrieval of certain objects are cached within an instance of ORBClient. This cache is cleared when the possibility exists of data being old.

Users and Authentication: the auth package auth.Authenticator is the interface that Response uses to interact with an external source of users, groups and authentication. Permissions, ownership of objects and user preferences are based on the users that are returned by this interface. A concrete instance of an Authenticator is ObjectServerAuthenticator, which validates users and passwords by attempting to login to an object Server via JDBC.

Instances of Authenticator return instances of AuthUserIfc, another interface, to represent users in the underlying authentication system. ObjectServerAuthenticator returns instances of ObjectServerUser. Authenticator also returns groups, which are instances of classes that implement Named. ObjectServerAuthenticator returns ObjectServerGroup. These references can be passed back to the authenticator to get all the users in a specific group.

Additional authentication modules can be written by implementing Authenticator and writing the corresponding user and group classes.

server.ObjectRetriever and Database Roots There are several roots in the Object Database, from which all the static and configuration data can be accessed. ObjectRetriever provides a single point of access from which all data can be reached. There are getXXX ( ) methods to lookup each root in the database and return it. Two of the most important and most frequently used are getConfigRepository ( ) and getTypeList ( ).

ConfigRepository is a singleton class which stores the configuration data for various Response subsystems. It also stores a reference to the TypeList (described below). The getTypeList ( ) method in ObjectRetriever proxies to ConfigRepository as a convenience method, as the TypeList is requested very often.

Types and OrgN Des dblayer Package

The static data in Response consists of a few sets of objects. Each individual object is referred to ass an "OrgNode" (Organizational Node). A typical Response installation may have a few Types of OrgNodes, where each OrgNode Type may have different fields or store a different type of data. Some examples of OrgNode Types would be Users, Nodes, Locations or Business Departments. All the OrgNodes of a specific Type can be grouped hierarchically or as a simple flat list. Certain types of data lend themselves to being arranged hierarchically, such as Business Departments while other types, such as Users, make sense as flat lists. Each type of OrgNode is referred to as a Type in Response.

The dblayer package contains most of the classes that are stored persistently in the database. There are a few exceptions, which will be discussed later. The OrgNode class in this package is the abstract superclass for all OrgNodes. There is a class called DefaultOrgNode, which is a concrete OrgNode that can store only one field, a name. It also allows the administrator to add additional fields to each Type of OrgNode that uses DefaultOrgNode. Other OrgNode classes, such as Rota, extend DefaultOrgNode and provide additional functionality. Still other OrgNode classes, such as SQLOrgNode are special in that they don't actually contain any data. Instead, they just contain a unique key into an external SQL based database and retrieve their fields when queried by another subsystem. Because of this, one can write additional OrgNode classes that get their data from any type of database on the fly. This will be discussed further in the section about OrgNodeBags.

The abstract superclass OrgNode provides a few methods that must be implemented in all subclasses. These methods give all OrgNodes certain properties. First, they each have a name and key. The key is a unique string that distinguishes each OrgNode. The name is often the same as the key but doesn't need to be so. It can be thought of as the display name.

There are two types of relationships between OrgNodes: children and links. Children allow OrgNodes to be arranged in a hierarchical manner, suitable for bubbling up through business departments or locations. Links allow the arbitrary association of OrgNodes of different Types. For example, a User may be linked to a particular business department. For OrgNode types that are stored in a flat list, such as users, typically, one might arrange them in a hierarchy by linking them up to another Type of OrgNode that is arranged hierarchically, such as Business Departments. One might link a User up to each OrgNode in the Business Department hierarchy.

Types, TypeList and OrgNodeBags

There is a singleton class called TypeList that can be accessed from the ConfigRepository (which is pulled from ObjectRetriever), from which OrgNodes can be retrieved or added to. The TypeList is the central root from which all OrgNodes can be reached. The TypeList contains references to many instances of the Type class. Each instance of the Type class contains references to one or more OrgNodeBags.

The interface dblayer.OrgNodeBagIfc is implemented by each type of OrgNodeBag. The function of an OrgNodeBag is to allow one to add and retrieve OrgNodes from a datasource. It has methods such as getOrgNodesFromKey ( ) and add ( ). An OrgNodeBag for a particular datasource is responsible for knowing how to pull OrgNodes from the datasource based on a supplied key. This allows all Response subsystems to access OrgNodes that may contain data from disparate databases without any knowledge as to where the data originated. Since a Type may pull OrgNodes from multiple OrgNodeBags, one could have a situation in which the User Type pulls some of its Users from the Object Database and others from another source such as LDAP. The LDAP OrgNodes would be created on the fly when subsystems requested them by supplying a key to the User Type. The fact that some of the User OrgNodes returned came from the Object database and others from LDAP would be invisible to the application.

The Type class also stores references to Customization classes. For each OrgNodeBag that a Type has a reference to, it may also have a reference to a Customization class. The customization class may be specific to each type of OrgNodeBag. For example, the SQLOrgNodeBag has a customization class called SQLOrgNodeCustomization, which stores configuration data such as the database host, port, username, password and schema. The DefaultOrgNodeBag has a customization called DefaultOrgNodeCustomization, which stores the additional field definitions for its DefaultOrgNodes.

Creating New OrgNodes

The Type class acts as a factory for OrgNodes of its Type. Therefore, to create a new instance of an OrgNode, one never actually calls the constructor for the specific OrgNode class one wants to instantiate. Rather, one gets a reference to the Type from the TypeList and calls instantiateOrgNode ( ) on it. Since a Type may contain more than one OrgNodeBag, and therefore, more than one class of OrgNodes (each OrgNodeBag can return references to specific classes of OrgNodes), there is a default "creation" OrgNode class defined by each Type. This is the type of OrgNode that is instantiated by the Type when instantiateOrgNode ( ) is called. For example, if the User Type contained two bags, one DefaultOrgNodeBag and one SQLOrgNodeBag, when instantiateOrgNode ( ) is called on the Type, a DefaultOrgNode might be created if the creation OrgNode class was set to DefaultOrgNode.

APIs There have been two APIs described in the previous section: The OrgNode API and the OrgNodeBag API. These two APIs work together to allow a programmer to create new types of OrgNodes whose data may be stored in any external datasource. The OrgNode API is implemented by extending the abstract dblayer.OrgNode class by implementing all the abstract methods such as enumerateLinks ( ) and enumerateChildren ( ). (See the javadoc for all the actual methods). By implementing these methods, the programmer can define how the children and links of the new type of OrgNode should be retrieved. For some datasources, enumerateChildren ( ) may not make sense. In that case, the programmer may simply return Util.getEmptyEnumeration ( ), which returns an empty enumeration. It will appear to the rest of Response as if the OrgNode has no children. The same applies for links. An example of this is SQLOrgNode, which returns links based upon the SQLOrgNodeBagCustomization, which allows the user to define which fields in the table should be used as foreign keys into other Response Types.

The corresponding OrgNodeBag API is implemented by defining a class which implements dblayer.OrgNodeBagIfc. This class is responsible for retrieving OrgNodes from its datasource. It may either return OrgNodes that are stored statically in a database (as in the case of DefaultOrgNodeBag, which returns DefaultOrgNodes from the ODI object database), or it may create OrgNodes on the fly based on data retrieved from another database (as in the case of SQLOrgNodeBag). The programmer may also implement the add ( ) method to allow Response to add new OrgNodes to the datasource. This may or may not make sense for any given datasource.

Certain OrgNodeBags which provide access to read-only datasources may wish to allow users to create links to and from objects in the back-end datasource. The method used to achieve this, as implemented in SQLOrgNodeBag, is to store the link information in the Object Database but keep the actual data in the backend datasource. We refer to these special links stored in the Object Database to data in another database as "shells", since they are really just pointers to data stored elsewhere and also act as a concrete object which stores links out to other objects.

There are other examples of OrgNodeBags and OrgNode classes act as proxies to access data in other Response subsystems. One example is AuthUserOrgNode and AuthUserorgNodeBag. These allow the users returned by the authentication module (discussed previously) to be treated as OrgNodes by the rest of Response.

Client/Server Interaction: Mementos and Identifiers

The OrgNode classes stored in the database are only meant to be accessed from within the Response server process. Although OrgNodes could be serialized and sent to the client for display and editing, we felt a cleaner solution, especially considering the openness of the API, was to provide a client side version for every OrgNode. One of the main reasons for this was the fact we didn't want any classes used by the object Database to be referenced on the client side. ODI provides some collection classes that are back ended by C++ code, to achieve fast searching and indexing. As a result of this, they are not Serializable using standard Java Serialization. To enable the data residing in classes which use these collections to be viewed and edited on the client, there exists a Memento class for each OrgNode class. The Memento classes are client side copies of the data retrieved from the OrgNodes residing in the datasources.

In addition to having OrgNodeMementos for each OrgNode, another type of class called an OrgNodeIdentifier. Whereas an OrgNodeMemento actually contains all the data from its corresponding OrgNode, an OrgNodeIdentifier only holds a pointer to an OrgNode residing in the server. OrgNodeIdentifiers are used as references to OrgNodes.

Example: GUI editing of an OrgNode—For example, when the GUI needs to display a list of all the OrgNodes of a specific Type, it makes a request to the Response server. The Response server sends back an array of OrgNodeIdentifiers, each of which contain the display name and key of an OrgNode. The GUI displays these OrgNodeIdentifiers on the screen. When a user wishes to edit an actual OrgNode, he clicks on the OrgNodeIdentifier. The GUI then asks the server for the OrgNodeMemento by sending the OrgNodeIdentifier. The user then edits the OrgNodeMemento. When the accept button is clicked, the GUI sends the OrgNodeMemento back to the server. The server finds the OrgNode pointed to by the OrgNodeIdentifier embedded in the OrgNodeMemento and calls acceptMemento ( ) on the OrgNode, passing the modified OrgNodeMemento as an argument. The OrgNode then changes its state to match that of the OrgNodeMemento. In this way, clients can modify data residing in various data sources without having any datasource specific classes sent over the network.

OrgNodeIdentifiers as Links

Another use of OrgNodeIdentifiers is in the storage of links between OrgNodes. Instead of actually storing references from one OrgNode to another, each OrgNode hold lists of OrgNodeIdentifiers, which point to other OrgNodes. This abstraction of OrgNode references allows any OrgNode to hold a reference to an OrgNode that may need to be pulled at runtime from another datasource. Since OrgNodeIdentifiers can be expressed as a string, any datasource capable of storing strings, can store references to OrgNodes in any other Response datasource. In this way, a web of objects residing in many different databases can all be woven together and accessed by Response as a composite database without any duplication of data.

In addition, an OrgNode's children are stored and returned as OrgNodeIdentifiers. Although this doesn't have as obvious a purpose as storing links as OrgNodeIdentifiers, it allows for the flexibility of storing different branches of a tree of OrgNodes in different databases. Currently, there is no example implementation that does this, but it is possible given the infrastructure, GUI Design Patterns There are several patterns that are common throughout the various components of the GUI. The com.micromuse.common.awt widgets, which are built on top of the JFC/Swing widgets are used in all screens. These widgets provide extra convenience methods as well as a more common look and feel throughout all screens. They ensure all fonts, colors, sizing, and borders are uniform. For convenience, they provide extra functionality such as built in models and scroll panes for widgets such as JLists. Another package that is used extensively is the com.micromuse.common.command package. This package provides an abstraction for blocks of code that need to be called by more than one GUI gesture. It also takes care of exception handling and ensures that exceptions resulting from gui gestures are bubbled up and displayed in a dialog box. The common.util.Debug class takes care of debug messages and allows redirection to a file.

Editor/Viewer Infrastructure

A reoccurring pattern in all Response client classes is the ability for the class to provide its own editor and viewer GUI's. The most obvious use of this is for OrgNodeMementos. Each OrgNode has a corresponding client side OrgNodeMemento, and each OrgNodeMemento has its own editor GUI and viewer GUI. The editor GUI is displayed when the OrgNOde is selected for editing in the configuration screen. The viewer GUI is displayed when the OrgNode is sent, as a result of an operator query, to be displayed in the Operator view. Typically, these are the viewers that are seen when an operator clicks on an event in OMNIBus and wishes to see all the OrgNodes associated with the event.

Since a user may click on many different instances of the same type of OrgNode, the editor/viewer infrastructure doesn't require the client to rebuild a new GUI every time another object is selected. Instead, it caches editors or viewers that have already been instantiated and reuses them to display the newly selected OrgNode. As a result, the gui component for the editor or viewer is only instantiated the first time a new type of OrgNode class is displayed. Thereafter, the editor is told to setCurrentObject ( ) to update its display. This editor/viewer API is contained in the common.editor package.

To create new objects that are editable and viewable using this infrastructure, a programmer needs only to implement the common.editor.UIable interface, which has a few methods such as getName ( ), getImageName ( ), and getUIFactory ( ). A UIFactory is a class which has two methods: getEditor ( ) and getviewer ( ), which return the Editor class and Viewer class, respectively. The reason for having a separate UIFactory class it that this UIFactory class may be sent over the network from the server to a client. This particular feature is not used for viewing and editing OrgNodes, but it is used for the Services registry, which will be explained later.

As alluded to in the last paragraph, the editor/viewer API is used for more than just displaying OrgNode editors and viewers. It is used for objects throughout Response. Some other examples are the Customization classes for each Type, as described in the section about Types and OrgNodeBags. In this example, each OrgNodeBag/OrgNode class can have its own GUI for configuration. One example of this is the SQLOrgNode/SQLOrgNodeBag customization screen, which allows the administrator to enter the JDBC host/username, table and fields. Another example is the DefaultOrgNode customization screen, which allows the administrator to add additional fields and reorder the objects in the bag. Another use of this will be explained in the discussion of the Service registry, in which each Service can have its own configuration screen.

The key to making it simple to create dynamic GUIs in which one part of the GUI changes as different objects are selected is the use of the EditorSwitcher class. An EditorSwitcher is a GUI component that implements the Editor interface. It caches the instantiated editor components and switches the proper GUI to the foreground when told to display a particular object. It also has a read ( ) method which calls the read ( ) method on the editor that is currently in the foreground. The read ( ) method tells the editor to set the state of the object being edited based on the state of the GUI. A top level editor such as an OrgNodeMementoEditor may also call a method in ORBClient ( ), such as ORBClient.acceptOrgNodeMemento ( ) to actually send the changed object back to the server to be saved.

Service API

The aforementioned sections described how data is organized using OrgNodes and how the transaction layer functions using TransactionManager. Thus, the infrastructure has been formed upon which applications can be built. Since one of the original intentions of Response was to perform many different functions leveraging the same pool of data, it was necessary to provide an API through which a particular application could interface with the data and the user. Furthermore, we knew it would be necessary to have the ability to write new applications which add functionality and drop them into existing Response installations without disrupting the running server. The Service API provides these abilities.

A service is a process running within a Response server that has access to the repository of OrgNode data and can communicate with all other services running in the same Response server. Any process that needs to run within the Response Server can be written to implement the Service interface. The server.Service interface has a few methods self explanatory methods such as startRunning ( ), stopRunning ( ) and getStatus ( ). These methods allow any service to be managed by the ServiceManager. The server.ServiceManager class provides a static API to start and stop any service by name, as well as logging facilities for all services. Each service can have its own log maintained. ServiceManager keeps track of which services are registered and allows the administrator to add new services by providing the name of the class which implements the Service interface. In this way, new functionality can be added on simply by adding a new service.

The Service Registry screen provides a view of which services are registered along with the status of each. When a service is clicked on, the service viewer displays the log for the selected service. The log is active, so if the service is running, its output will be streamed into the log viewer. This is done using the previously described ORBPublisher/ORBSubscriber update scheme. Along with the log, start and stop buttons are provided to control the activation of each service.

The service configuration panel provides a configuration screen for each service. Every service can define its own GUI for configuration. In addition, this GUI can have active buttons that invoke functions in real time on the service running in the Response Server. The standard used for saving configuration data for individual services are the ConfigRepository.setProperty and getProperty methods. These methods allow each service to store its parameters in its own file, named <servicename>.props. Since these are text files, administrators can edit these files using a standard text editor. This is only a standard; it is not hard coded, as each service can implement its own methods for setting and getting configuration data. Therefore, the configuration screens can dynamically apply changes to the service, even if it is already running.

RemoteServiceInterfaceIfc

The flexibility provided by the Service configuration screen is made possible by the use of RemoteServiceInterfaces. A RemoteServiceInterface is an RMI remote class returned by each service running within Response. This remote interface can be requested by the client (or any other subsystem) to allow methods to be called on it remotely. Since this interface is returned by the service, it can be subclassed and customized to provide special functionality for each service. The interface which must be implemented is server.RemoteServiceInterfaceIfc. It has methods that are necessary for all services, such as startRunning ( ) and stopRunning ( ). Basically, it has methods to provide access to all the methods in the Service interface. For example, it provides startRunning ( ), stopRunning ( ) and getstatus ( ) methods. It also has an addStateChangeSubscriber ( ) method which allows a component such as the Service Registry GUI to add itself as a subscriber to the service so that when the service's status changes, the GUI can be updated immediately. This eliminates the need to poll the server for service status and ensures the administrator will always have an up to date view as to which services are running.

Dynamic Service GUIs

The ability to provide different GUIs for each Service is accomplished using the UIable interface, just as the OrgNode viewers and editors use. However, services make use of the fact that a UIable object returns a UIFactory instead of an actual instance of the GUI component itself. A class called ServiceMemento is returned by the ResponseServer for each Service that the client wishes to configure or view the log for. ServiceMemento is not subclassed for each Service, as OrgNodeMemento needs to be subclassed for each OrgNode. This is not necessary for services since the purpose of a ServiceMemento is not just to send static data back and fourth, but to provide an active GUI for the service. To accomplish this, it contains the UIFactory for the particular service as well as a RemoteServiceInterface to the service running in the client. It also contains the log for the service up until the point the client requested it. When it arrives on the client side, the client asks the UIFactory in the ServiceMemento for a viewer and editor. The viewer is the screen containing the log and the start/stop buttons. The editor is the configuration screen. Next, the RemoteServiceInterface is given to these two GUI components so they can communicate with the service running in the Response Server.

Service Logging

As soon as the ServiceMemento arrives at the client, it connects back to the service running in the Response Server and adds itself as a log subscriber. The Service viewer then subscribes to the ServiceMemento. In this way, log data from the Service is sent to the ServiceMemento in the client, and the service viewer displays it. This reason this multi-tiered approach was taken is that whenever a service is selected in the Service Registry, it does not have to download its entire log from the server, as each ServiceMemento continues receiving log updates even if it not displayed. This mechanism could be modified if scaling proves the traffic generated by log updates to be an issue. However, an important consideration to be made is that the current design could allow multiple services to be viewed in different windows simultaneously.

Subclassing RemoteServiceInterface

Although the RemoteServiceInterface for a particular service must provide some complicated functionality, a developer designing a new Service doesn't need to implement all this functionality from scratch when writing the RemoteServiceInterface. Instead, he can simply extend service.RemoteServiceInterface, which implements RemoteServiceIntefaceIfc and provides all the basic functionality such as proxying the start/stopRunning ( ) methods and getStatus ( ) methods to the corresponding Service. If the service doesn't required any special configuration methods for its config screen, the developer can simply return an instance of RemoteServiceInterface directly, without even subclassing it.

Other Uses for Services

Another use of the Service API is for an OrgNode viewer or editor to display actively changing data. An example of this is the SLAM prototype, which uses the RemoteSLAMRoosterServiceInteface to have service level updates pushed to it. Basically, the service API provides a general way for any client side component to communicate with any server side component without requiring any Response classes to be modified.

Actual Services: EmailReader and Rooster

A number of Services currently exist for Response in addition to SLAM. A simple example of a service is the EmailReader, which checks an emailbox every so often. Its UIFactory returns an instance of client.EmailReaderEditor as its configuration screen (editor), which allows the administrator to configure the POP server, username and port. EmailReader subclasses a service called server.Rooster. Rooster is an abstract service which executes a particular piece of code periodically. It is similar to cron, except it is not a full fledged scheduler. Future versions of Rooster could add scheduling functionality to run the service at specified times. EmailReader defines an instance of the common.command.Command class, which is similar in functionality to TransBlock, in that it has a doit ( ) method overridden with the actual code to be executed. The doit ( ) method for EmailReader pops the email from the mailbox and passes it to the MessageAcceptor subsystem, which will be defined later. To subclass Rooster, EmailReader calls Rooster's constructor with an reference to its Command class, and the period, which is by default 30 seconds. Rooster was defined to be abstract since other Services that need to run periodically also subclass it.

Services Just for Configuration and Logging

EmailSenderService is an example of a Service whose sole function is to provide a configuration screen and logging for a particular Response subsystem. The Email sender doesn't actually need to be run periodically—it runs when it is called by the SendEmail action (to be described later). However, it does need a GUI to allow the administrator to configure the outgoing SMTP host. By creating a simple service whose startRunning ( ) and stopRunning ( ) methods don't do anything, we were able to provide a GUI for the EmailSenderService without having to add any code or additional screens to Response. Its log facility is also used to provide the administrator with a log of emails that have been sent.

EventBroker: Real Time Event Processing

The most intricate Response service is the EventBroker. It provides Response's real-time event processing. It is the gateway between the real time event feed from the Objectserver and the action tree processing subsystem (described in the Action Trees document). The event.ObjectServerDriver class connects via JDBC to the ObjectServer and polls for new events using the StateChange field. The parameters are configured using the EventBrokerEditor GUI, which is the GUI for the EventBroker service. Whenever new events are read, they are placed in a buffer and read one at a time by the EventBroker. The EventBroker packages each event in an instance of the ObjectServierEventContainer class. This class is simply a hashtable of field/value pairs with some added functionality to support flagging of modified fields. The EventBroker also has a putEvent ( ) method which can send the modified fields in an EventContainer back to the ObjectServer. These fields may be modified by an ActionTree that is performing event field substitution or adding add journal entry for a particular event.

The EventContainer is passed to trigger.ServerMessageSender. ServerMessageSender packages the event in the common.Message class, which encapsulates an event along what type of event it is. The type of the event determines what should be done with the event. For example, an incoming e-mail and an event from the Object Server are both incoming events, but different functions are performed on them. ServeMessageSender is responsible for passing Messages to the MessageAcceptor class. MessageAcceptor places all incoming Messages that need to be Processed in a queue.

A class called MessageProcessor is the consumer of the Messages in MessageAcceptor's queue. For each Message it reads from the MessageAcceptor queue, it executes the proper Action Tree on the event contained in the Message. There is a special instance of MessageProcessor in the ResponseServer that is reserved for Messages that need to be processed immediately, as opposed to being put in the queue. This is used for events that are sent by an operator who wishes to get immediate feedback. ServerMessageSender takes a boolean argument called needImmediateReply which determines whether the Message being sent will be processed by this special reserved MessageProcessor.

Distributed event processing with multiple MessageProcessor—Multiple instances of MessageProcessor can all process events from a single MessageAcceptor queue. In fact, not only can a ResponseServer have multiple MessageProcessors (with each one having its own thread), but Messageprocessors can actually run on different machines and all process events from the same MessageAcceptor. Using this capability, Response can be scaled to process many more events per second than a single Response Server could handle. Since each MessageProcessor makes its own connection to the database and datasources, having multiple MessageProcessors does not impose extra load on the single Response Server. The only performance bottleneck is the single EventBroker which reads events from the Objectserver into the MessageAcceptor queue. Since each VM can have its own connection to the database, running multiple MessageProcessors in different VMs gets around OSJI's limitation of only allowing one transaction per VM and allows events to be processed in parallel.

Currently, event substitutions (EventBroker.putEvent ( )) are all fed back to the single EventBroker, so another bottleneck is updating events. This could easily be reworked to allow each MessageProcessor to open its own connection to the ObjectServer. The reason this would be difficult to do for reading events is that it would be difficult to ensure that two EventBrokers didn't process the same events. Even here, it would be possible to setup each EventBroker with mutually exclusive filters to spread the load.

As Response stands now (July 1998), support for distributed event processing is technically possible but not fleshed out in terms of ease of configuration. The service API is not designed to aggregate log information from services running in different VM's so error messages arising from MessageProcessors in different VMs would not show up in the central EventBroker log. Since these issues would need to be fleshed out prior to really making distributed event processing part of the Response release, a possible scenario may be for distributed event processing to be pushed from version 1.0, but is architecturally possible.

Action Trees

The Action Tree document explains how Action Trees work on a high level. The following sections assume the reader is familiar with the concepts described in that document. This document will address how the systems works from a technical perspective.

The dblayer.ActionNode class, as well as the dblayer.ActionDecisionBranch class extends dblayer.OrgNode. This means they can be treated by Response as regular OrgNodes. They can be linked to other OrgNodes and viewed by the graph viewer since an Action Node's branches are exposed through the OrgNode API as children and a branch's target ActionNode is exposed as a child. The ActionTree Editor is just a specialized editor tailored for creating ActionTrees, but technically speaking, the regular OrgNode configuration screen could be used, although it would be more cumbersome.

All executions of ActionTrees are spawned by a MessageProcessor. When a message is received by a MessageProcessor, it determines what to do based on the type of the Message. There are two types of Messages that are currently used. The more basic one is Message.ACTIONNODE. When MessageProcessor receives this type of Message, it loads the root Action Node in the Action Tree and activates it, passing the event encapsulated in the message as a variable in the incoming VarList called "EventContainer". (See the Action Tree document for a detailed description of VarList).

The Action Package

The action package contains classes that pertain to Action Modules and their execution.

The action.Action class is the abstract superclass for all Action Modules. While executing, an action can "post" results that will be returned when the action tree finishes executing. This is how action trees that return OrgNodes to the client return their results. The Action superclass provides functionality for posting results (using the postEscalationResult ( ) method) as well as for returning events to the object server using the retvent ( ) method. This facility is used by the ReturnEvent Action, which is used for event field substitutions. Logging is done using postResult ( ), which takes a string. These log messages can be viewed with the Escalation GUI if the proper level of debug is turned on. Eventually, these logs will be redirected through the Service API.

The Action class also defines the methods getArgParams ( ), getReturnParams ( ), and getDesc ( ) which require subclasses of Action to expose the arguments they expect in their incoming VarList context, what they return and a description of what they do. Currently, the only data exposed by these methods that is actually displayed is getArgParams ( ). The "Build Expression" button on the Action Tree editor gets the list of arguments that the selected Action module expects and displays them in a GUI, allowing the user to enter a value for each one. In the future, the Action Tree editor should make more use of this data to facilitate the building and error checking of Action Trees.

Each instance of an executing Action Tree has an escalation number. The escalation number is used for logging purposes, for returning data, and to keep track of what is being done to each particular event. Each new event gets assigned its own escalation number before its action tree is spawned. action.ActionTracker is a singleton class that assigns new escalation numbers and keeps track of all the running escalations with an instance of EscalationInfo for each escalation. EscalationInfo extends ActionResultHolder, which is the actual class that stores the results returned by the escalation.

Hibernations

One particularly interesting Action Module is Hibernate. The Hibernate action triggers a process which saves the state of the currently executing action tree to the state database and stops executing, resulting in the action tree going to sleep or into "hibernation". This action plays an integral part in action trees that that stop and wait for something to happen. A typical example is an action tree which e-mails an administrator and then hibernates, waiting either for an a-mail from the administrator to acknowledge the event, or for a timeout, causing the action tree to escalate the event to the next administrator.

The Hibernate action calls the saveState ( ) method in the Action superclass. This creates an instance of dblayer.ActionTreeState, which encapsulates the state of the currently executing action tree by saving the VarList context along with a reference to the action node that it is up to. A reason for the hibernation, the escalation number, and a reawaken time are also saved. The reason can be displayed in the Escalation viewer, which is just a debug screen used to see what Action Trees are currently in hibernation and what time they are scheduled to reawaken. The ActionTreeStateRepository is the class that actually stores the collection of ActionTreeStates. The ActionTreeStates are indexed by an integer called an ActionKey. This number is used to find and reawaken a hibernating action tree. The ActionTreeStateRepository also stores the ActionTreeStates in order of their wakeup time. The server.EscalationRooster Service, which runs periodically tells the ActionTreeStateRepository to reawaken any hibernation whose wakeup time has passed. No searching is necessary since the ActionTreeStates are ordered by wakeup time. If a hibernation is woken up by the EscalationRooster, a variable called WakeupReason is injected into the VarList context with the value "EscalationRooster". This allows a branch that is executed after the hibernation is woken up to determine if it was woken up because of a timeout.

Another way for hibernations to be woken up is by receiving a "wakeup call". A wakeup call is the other type of message besides Message.ACTIONNODE that can be sent by ServerMessageSender. The message type for a wakeup call is Message.WAKEUPCALL. When MessageProcessor receives such a Message, it gets the variable from the VarList context in the Message's event called "ActionKey" and uses it to look up the hibernation that needs to be woken up. The "ActionKey?" variable should be set by the service that is generating the wakeup call. The only generator of wakeup calls at the moment is the EmailReader service, which gets the ActionKey by parsing the subject field of the e-mail received. It looks for an integer following a hash mark (#) in the subject. The EmailReader generates an EventContainer in which it stores the various parts of the e-mail. The fields set in the EventContainer are: "Subject", which stores the subject, "Body", which stores the body, and "Sender", which stores the sender of the e-mail. This EventContainer is placed in the VarList context of the wakeup call in a variable called WakeupEvent. This allows the action tree that is being woken up to branch based on data from the received e-mail. A typical application of this ability would be to parse the e-mail received and acknowledge the event if the user replied "OK" or to escalate the event if the user replied "ESCALATE".

The FindEscalationsByActionKey action gives an Action Tree the ability to look up a hibernation by Action Key. Once the hibernation is found, the ActivateHibernation action wakes up the found hibernation and transfers control to it. Using these actions, an event received from the Object Server or sent by an operator can be used to trigger the wakeup of an action tree that is hibernating. In such a situation, the ActionKey would be stored in a field in the Object Server. This is the scheme used in the 'Guided Actions' action tree, which stores the hibernation to be woken up in the ResponseActionKey field.

Using ReturnEvent to update the ObjectServer, and Hibernate to save state, one can build very powerful workflow or problem management applications in Response that are tightly integrated with the ObjectServer. In fact, if the EscalationRooster Service and the SendEmail action are used automatically, the entire event escalation process can happen automatically without operator intervention and progress can be monitored using the EventList.

Before we leave the subject of hibernation, a word must be said about their data storage. The Action.saveState ( ) process is quite complex because the entire action tree context must be traversed deeply, copying certain variables and performing transformation on others along the way. Copies are made to ensure that no direct cross-database references exist. This is because cross-database references to ODI persistent objects require the objects to be "exported", a timely process. Instead, copies are made of all objects except OrgNodes. When OrgNodes are found in the context, they are replaced by OrgNodeIdentifiers, since OrgNodeIdentifiers are meant to be external pointers to data in the static database. Additionally, since some of the OrgNodes in the action tree context may not actually be persistent anyway (they may have been generated dynamically by a bag such as SQLOrgNodeBag), it is necessary to store all OrgNodes as OrgNodeIdentifiers. This step also gets around the problem of having to copy the data stored in an OrgNode between databases. OrgNodes should never be copied—only copies of OrgNodeIdentifiers should be made and shipped around. When the hibernation is reawoken, the OrgNodeIdentifiers in the context are transformed back into OrgNodes before the executing of the action tree is resumed.

Determining Action Tree Flow Dynamically

In some situations, one might want to configure an action tree whose execution flow is determined by the data it traverses. An example of this type of scenario would be the situation where each user has a different contact method and each contact method is carried out by different action tree. In such a situation, one cannot create a single monolithic action tree unless one is willing to create branches to every possible contact action tree and branch on a special variable in the user's OrgNode. A more dynamic approach is to take advantage of the fact that ActionNodes are OrgNodes and can have links. The user could link up his preferred contact method ActionNode to himself and the action tree could find a link of type "Action" linked up to the user's OrgNode. Then, the Activate action can be used to transfer control to the ActionNode that was found, causing the user's preferred contact method to be executed.

Another example when this technique can be used is when it is necessary to execute different parts of an action tree based on the event. For example, one may want to find the administrator hooked up to the OrgNode found from the @Agent field in the event or from the @Node field, depending on the value of the @AlertKey field. If @AlertKey="router", the lookup should be done based on the @Node field. If @AlertKey="app", the lookup should be done based on the @Agent field.

To solve this problem, create two Action Trees. The first one does a lookup based on the value of the @Agent field. The second does a lookup based on the value of the @Node field. Then, create a response Type called ActionKey and create two OrgNodes, named "router" and "app". Next, link the action tree which does lookups by @Agent to "app" and link the action tree which does lookups by @Node to "router". Then, configure the main action tree to do a Lookup for an OrgNode of type "AlertKey", using the value of @AlertKey as the name. From there, do a LookupLinks for an OrgNode of type "Action". Finally, do an Activate to activate the Action Tree that was linked to the AlertKey OrgNode. After this dynamically found action tree executes, the administrator OrgNode will be left in the action tree context.

Such complicated action tree shouldn't be typical, but it is possible to create them. The only drawback to such dynamically constructed action trees is that one cannot fully visualize them since it is impossible to know which action nodes will be executed without actually executing the action tree.

There are about 15 other actions in the action package, most of which are pretty self explanatory. To find out what each does, examine the getDesc ( ) method.

Getting data from OrgNodes: REL and the VarGettable interface—As action tree execute, they perform functions using data pulled from the OrgNodes they find and traverse. The REL language is used to pull values from OrgNodes and assign these values to variables in the context, to be used as input to other Action Nodes. (See the REL document for the specific grammar documentation). REL does not need to know what type of OrgNode it pulling data from. It can pull data from any OrgNode because all OrgNodes implement the common.VarGettable interface. This interface has a few methods, the most important one being getVar ( ). This method takes a string as a parameter, which is the name of the variable to be pulled. Each OrgNode is responsible for implementing this interface so as to fully expose as much of its data as possible.

In addition to returning strings or integers, the VarGettable interface can return any Object. This means it can return another VarGettable object, allowing an REL expression to extract data that may be deeply encapsulated in an object containment hierarchy. Through the use of REL expressions and the VarGettable interface, it is possible to traverse through object hierarchies and pull specific: pieces of data. This feature will be an integral component in providing full command line access to all Response data.

Rota: Multi-Level Object Hierarchy

An example of such an object hierarchy is the Rota OrgNode. dblayer.Rota is a special OrgNode, which extends DefaultOrgNode, that is used to schedule a list of OrgNodes. Each OrgNode has a series of TimeBlocks that define when the particular OrgNode should be considered "on call". Since any type of OrgNode can be scheduled in a rota, one could use Rotas to have a different user selected based on the time, as well as different documents or severities. By scheduling severities, an administrator could configure a system in which the severity of an event is determined by the time of day and day of week. This is useful in situations when certain down events may occur during scheduled downtime, and therefore may not be important. Conversely, events that occur during prime time hours may be more important. Instead of having to do the scheduling at the probe level, and therefore requiring the scheduling data to reside in many rules files, the administrator could have one central point of administration where all events relating to a particular service could be prioritized by time.

The object hierarchy for Rota is as follows:

```
Rota
  ^
  many
  RotaMember
  ^                         ^
                             many
  OrgNodeIdentifier             TimeBlock
(the actual OrgNode)
```

Rota contains many instances of RotaMember. Each RotaMember contains a reference to an OrgNodeIdentifier, which is the orgNode being scheduled. The RotaMember also contains a list of TimeBlocks, each one specifying one range of time that the OrgNode is scheduled for.

To use REL to print out the first TimeBlock of the first member, you could use the expression:

Rota.members[0]. TimeBlocks[0]

In this example, Rota is the variable containing the Rota OrgNode. We pull out the variable called "members" from Rota, which returns an array of RotaMembers, each of which is VarGettable. We reference the 0'th element using the [ ] operators, as described in the REL grammar. Now, we have a single reference to a RotaMember. Next, we pull out the "timeBlocks" variable, which is an array of TimeBlocks. Finally, we reference the 0'th timeBlock. We could go father and pull out the starting time or ending of this "timeBlock" as follows:

Rota.members[0]. timeBlocks[0] start or

Rota.members[0]. timeBlocks[0].end

The particular names of the variables that can be pulled from each object are exposed by the VarGettable interface using the enumerateVarNames ( ) method. Using this interface, a GUI could be built to facilitate the creating of REL expressions.

VarGettable variables returned by all OrgNodes—There are certain variables that all OrgNode classes expose through VarGettable. This functionality is provided in the OrgNode superclass. First, any method that returns a String can be accessed through VarGettable if it conforms to the JavaBeans style method naming scheme. Namely, the method must be called getXXX( ), where XXX will be the variable accessible through VarGettable.

For example, suppose a particular OrgNode class had a method called getPersonalEmail ( ) and you wanted to send an email to the person's personal e-mail address. Assuming you were using REL to set the inputs for the SendEmail action, you could use the expression:

Address=User.PersonalEmail;

There are a few special variables returned by OrgNode. They are as follows:

| | |
|---|---|
| name | Returns the name of the OrgNode |
| type | Returns the name of the type of the OrgNode (ex Rota or Node) |
| parent | Returns the parent of the OrgNode (the actual OrgNode reference, not just the name of the parent. To get the name of the parent, use parent.name;) |

DefaultOrgNode's VarGettable Interface—DefaultOrgNode and its derived classes allow the administrator to add additional fields using the Customization button in the Type Registry. The data stored in these extra fields can be accessed through the VarGettable interface. The variable names are the names of the fields defined on the field customization screen. Note that the variable name is used, and NOT the display name. For this reason, it is NOT advisable to use fields with spaces in them, since they will not be accessible from REL using the VarGettable interface.

SQLOrgNode's VarGettable Interface—SQLOrgNode returns the values of the fields returned from the SQL database. The variable names are the column names in the database, as defined in the customization screen for SQLOrgNodeBag.

Operator Initiated Actions—Previously, we discussed how the EventBroker reads events from the ObjectServer and how they flow to MessageProcessor to be processed. This is known as real-time event processing. In our discussion, we mentioned the needImmediateReply option for the common.Message class. Its use is for operator initiated actions. In this section, we will explore the flow of operations for operator initiated actions.

A typical example of an operator initiated action starts when an operator is viewing events in the Omnibus EventList. The operator sees a particular event for which he would like to retrieve Response information. He selects the event, clicks on the Tools menu and selects "Response Lookup". This tools is configured to execute a stub program called EventTrigger, located in the trigger.EventTrigger class. The tools runs a script which passes all the field values from event as command line arguments to the EventTrigger program. In addition, it sends the % username % field to identify which Response client should receive the data to be displayed. It also sends the name of the Action Tree that should be executed. This allows the administrator to configure different tools, which run different Action Trees, each of which may lookup different information. So, a typical script run from the tools menu might look as such:

java COM.micromuse.response.trigger.EventTrigger % username % "LookupResponseDataActionTree" Node @Node Agent @Agent Summary "@Summary" Serial @Serial Severity @Severity.

The EventTrigger program, running on the nco client machine, connects to the central Response server and passes these parameters. The Response server maintains a list of which users are logged in from each instance of a Response client. The response server executes the action tree specified by the EventTrigger program, passing the event fields as input to the action tree. When the action tree returns, the results are passed to the client as OrgNodeIdentifiers. The "Operator View" screen in the client displays buttons for each OrgNodeIdentifier in a vertical row on the right side. When one of the buttons is clicked on, the OrgNodeMemento is retrieved from the server and the viewer is displayed on the right side. EditorSwitcher is used to switch between various viewers and OrgNodeMementos.

The viewer for each OrgNode (Memento) is different from the Editor in that it is read only and specifically designed to be used for the Operator View. Most viewers are similar to the editors for their respective OrgNodes with a few exceptions. The Rota viewer provides a split view, where the top of the viewer lists buttons for all the OrgNodes that are currently on call. When one is clicked on, its viewer is displayed in the bottom half of the viewer.

The User OrgNode viewer is special in that it displays all Action Trees that are linked to the User OrgNode and tagged with the Action Node Attribute "Contacter". Action Node Attributes are flags that can be set on any Action Node. They are simply used to specify what purposes a particular Action Node can be used for. Typically, one may link up various contact method action trees to a User. One might be "Contact via E-Mail", and another may be "Contact via Pager". Both of these Action Trees would have their root action node flagged with the Contacter Action Node Attribute. The list of available Action Node Attributes can be modified in the Administration screen. Action Nodes can be flagged with an Action Node Attribute in the Action Tree Editor.

The User OrgNode viewer has a box in which buttons are created for each Action Node linked to the User that is a Contacter. When one of the buttons is clicked on, the viewer for the Action Node is displayed in the bottom half of the User viewer. The viewer for an Action Node is another viewer that is very different from the Editor. The Action Node viewer is specifically designed for launching the action tree. Sometimes it may be necessary for the operator to include certain parameters for the Action Tree such as EmailAddress or TextMessage, when sending an e-mail. The ActionTree editor allows the administrator to define certain User Parameters that need to be entered before executing the action node. If the action node being viewed has any User Parameters defined, the Action Node viewer will create a form which the operator must fill out before clicking the "Execute Action Tree" button below the form. When this button is clicked, the values in the form will be sent to the server and the action tree will be executed. The values from the form will be passed as input variables to the action tree.

Sometimes there may be certain fields that should be copied from the User OrgNode into the Action Node viewer form as defaults. This can be arranged by defining User Parameters with the same names as the field names in the User OrgNode. The Action Node viewer will automatically copy the values for any fields whose names match. An example of when this is useful is for passing the EmailAddress field from the User OrgNode as the default EmailAddress for the "Contact via mail" Action Tree. Note that the actual UserParameter names are used for matching and NOT the display name. So, even if the UserParameter for the Action Node is called "Address" because the Sendmail action requires a variable called "Address", the field name in the form could show up as "Email Address".

The mechanism for the Operator Viewer callback is publish/subscribe based. When the Operator View screen is initialized, it creates a callback method which is an RMI remote class. The callback method is registered with the Response server using the username as the client identifier. This client identifier is the string sent as an argument to the EventTrigger program.

Currently, the username used to login to Response is used to register the callback. However, if this isn't flexible enough (due to multiple users logging in with the same name), this client identifier could be specified on the command line to the Response GUI. This would allow the use of a more unique identifier, such as a concatenation of the user and the X display host, or some sort of machine ID.

REL Primer

Purpose

REL stands for Response Expression Language and its primary function is to act as glue to tie together action nodes in an action tree. It can be used to map values to variables in an action tree context, which is passed from the output of one action node to its branches, and then as input to subsequent action nodes. Since the outputs of one action node may not align perfectly with the inputs of the next action node, it is necessary to do mappings to ensure each action node receives the correct inputs that it requires. Additionally, it may be necessary to allocate temporary variables in which to store values that may need to be re-used. This is typical in a bubble-up action tree, where you may need to save a reference to the last business unit encountered to enable you to return to it later to bubble up the hierarchy.

Grammar

REL grammar is similar to a scripting language such as perl or unix shell. There are two distinct parts to a REL assignment expression: the left side and the right side. The left side is the variable to be assigned to, and the right side is the expression to be evaluated and assigned to the variable on the left. Assignment expressions are always followed by a semicolon. A typical assignment might be:

EmailAddress="admin@mydomain.com";

Here, the variable to be assigned to is "EmailAddress", and the value to be assigned to this variable is the text string "admin@mydomain.com". Literal strings are always enclosed in quotes. You may also reference other variables on the right side and concatenate them using the+ operator as follows:

Problem="Node went down.";

TextMessage="You are being e-mailed because:"+Problem;

Variables are untyped and do not need to be declared. Just as you assign a string to a variable, you can assign integers:

Severity=5;

Severity=Severity+1;

Severity=Severity−2;

Valid operators for integer manipulation are +, − and *. If you try to mix integer and strings in an assignment, certain rules determine the result. Generally, if you add an integer to a string, the result will be a string with the integer concatenated with the string. Other operations that don't make sense such as subtracting a string from a string will just yield a runtime error (not a parse error!).

Severity=5;

Problem="Severity has exceeded";

TextMessage=Problem+Severity;

Variable Members

Certain variables can hold other variables, similar to how a perl associative array can hold multiple values indexed on string keys. One such example is the special variable EventContainer, which represents an event from netcool or from another source. An event is an object that is comprised of many fields. To access member variables, use a period, For example, to access the Node field from an EventContainer and construct a status message using it, you may write:

TextMessage="There was a problem with"+EventContainer.Node;

You may use variable members on the right side of an assignment expression. This example changes the Summary field of an EventContainer and uses the Severity member to construct the new value:

EventContainer.Summary="Severity has exceeded"+EventContainer.Severity;

Some variables have special members that can be accessed. For example, OrgNode has a variable accessible by the key "parentOrgNode". If OrgNode contained a Business Unit, and you wished to assign it to the value of its parent ("bubble up"), you may say:

OrgNode=OrgNode.parentorgNode;

Another such special member of OrgNode is "name". OrgNode.name will return the name of the OrgNode as a string. An example of this would be:

EventContainer.JournalEntry="Escalated to business unit:"+OrgNode.name;

Arrays

In addition to referencing members of a variable, you may reference array indices. For example, to set a variable equals to an array of strings, you may do the following:

Types=("Rota", "User", "Business Unit");

You can also create arrays of other variables:

Names=(EventContainer.Node, EventContainer.Agent);

To reference an element in an array, you simply use the following notation:

Type=Types [0];—Assigns the zero'th element of Types to the type variable.

or

OrgNode=OrgNodes [0];—Assigns the zero'th element of OrgNodes to the OrgNode variable.

or

Type Num=1;

Type a Types [TypeNum];—Assigns the TypeNum'th element of Types to the Type variable Currently, you cannot assign directly to an index into an array as shown:

Types[1]="Rota";—This currently will not work

REL Evaluation Expressions

REL can also be used to evaluate boolean expressions in a similar fashion to SQL. This is how REL is used to determine which branches to execute after an Action Node is executed. The same grammar which applies to the right hand side of a REL assignment expression is used for evaluating expressions. For example, a simple REL evaluation expression is:

5=5—always evaluates to TRUE since it does not depend on any variables

Notice that there is no semicolon after a boolean evaluation expression, as no assignment is being done. The expressions on both sides of the logical comparison operator are evaluated and compared to return a boolean (either TRUE or FALSE). More complex evaluations which take advantage of variables and member variables are possible as well:

| | |
|---|---|
| Node = "mybox" | evaluates to TRUE if Node contains the string "mybox" |
| Agent = "diskagent" | evaluates to TRUE if Agent contains the string "diskagent" |

-continued

| | |
|---|---|
| OrgNode.parent != NULL | evaluates to TRUE if the member variable "parent" of the variable |
| OrgNode is NOT null | |

Either side of the evaluation expression may contain any valid REL operators

| | |
|---|---|
| Position +1 > 5 | evaluates to TRUE if the Position variable plus 1 is greater than 5 |

You may also use boolean logical operators to perform more complex SQL-like evaluations:

| | |
|---|---|
| (Node = "mybox") AND (Agent = "diskagent") | evaluates to TRUE if Node equals mybox AND Agent equals diskagent |
| (Node = "mybox") OR (Node = "yourbox") | evaluates to TRUE if Node equals mybox or yourbox |

You can also make use of functions in evaluation expressions. To test if the fourth word of the Summary field is "down", use the following:

extract (Summary, 3)="down"

The LIKE Operator: The LIKE operator uses a regular expression to match a particular value. The regex may be any valid Perl 5 flavor regex. For more information, see the Perl 5 manual. To test if the Node field ends with 'corn', use the following expression:

Node LIKE '.*com'

If Statement

You can use the IF operator as follows:

if (Num>0) {EventContainer.Summary="Found"+Num+ "objects.";}

REL Function Reference

REL supports functions that can perform specialized operations.

Eval ( )

Eval(<expression>, <context>) will evaluate <expression> using variables pulled from <context>.

Example:

Context=NewObject ( );

Context.Node. 'wombat';

Context. Agent='disk';

Message=eval("'The machine"+Node+"had a problem from"+Agent', Context);

Message would be equal to:

The machine wombat had a problem from disk

Extract ( )

extract(<long string>, <index starting from 0>, [<word delimeter>]) <long string> is the entire string to extract from. <index starting from 0> is the word index. <word delimeter> is an optional field which specifies the word boundary (space is the default).

extract ( ) allows you to extract a specific word from a longer string.

Example:

To extract the 2nd word from the Summary field in an event, you might use the following assignment expression:

AffectedNode=extract(EventContainer.Summary, 1);

Float ( )

float(<int>\<string>\<float>) returns a float representation of its argument.

Localtime ( )

localtime(<seconds_since_epoch>, [<pattern>])

This is used to format an integer containing the number of seconds since the epoch into a string using an optional specified pattern.

Example Patterns:

"MM/dd/yyyy HH:mm:ss zz"

"EEE, MMM dd, yyyy h:mm a zzzz"

To obtain <seconds_since_epoch>, you can use getdate( ). Therefore, to get the current formatted time, use localtime (getdate( )).

Example:

t=localtime(getdate( ));

t will have a value similar to: Jun. 5, 1997 09:56:22 EDT

Example:

t=local time(getdate ( ), "EEE, MMM dd, yyyy h: mm a zzzz");

t will have a value similar to: Fri, Jun. 5, 1997 9:58 AM Eastern Daylight Time

This function is useful when you are trying to insert a date into a SQL based database which requires dates to be inserting in a particular format.

Getdate( )

getdate( ) returns the current time in seconds since midnight GMT on Jan. 1, 1970.

int( )

int(<float>|<string><boolean>|<int>) returns an integer representation of its argument.

It is necessary to use into when updating a field in a database that you know to be of an Integer type with a variable that is currently not an Integer. Example: (assume OrgNode is pulled from an external SQL database which has a column called Severity which is an Integer):

NewSeverity="5";

OrgNode. Severity=int (NewSeverity);

Failing to use int ( ) in this case would have caused an error.

Length ( )

length(<array>) returns the length of its array argument.

Log( )

log(<expression>) records the value of <expression> using the ActionTreeLogger service. This is very useful for debugging Action Trees as it allows you to inspect expressions from the context.

NewEvent( )

This is used in conjunction with a ReturnEvent action module-based action node when it is desired to insert a new event into the ObjectServer. To cause ReturnEvent to insert a new event, assign a Newevent ( ) to the EventContainer variable.

EventContainer=NewEvent( );

EventContainer.Node="abc";

EventContainer.LastOccurrence=getdate( );

EventContainer.Identifier=EventContainer.Node+"is down";

When using NewEvent( ) in conjunction with ReturnEvent, it is important to note that there are no default fields set, as there are when using a probe. It is necessary to set all required fields in the event. This is why we must set LastOccurrence and Identifier explicitly.

NewObiect ( )

NewObject( ) creates a new object which can be used as a context to store other variables in.

Example:

Context=NewObject( );

The following three examples are all equivalent:

Context. Node='abc';

OR

Context["Node"]='abc';

OR

VarName="Node";

Context(VarName)='abc';

This last example shows how to store variables is a context when the actual variable is stored in a variable. Assigning values in a context is similar in concept to the notion of associative arrays in perl.

Random( )

random(<upper_bound>) returns a random integer in the range [0, <upper_bound].

rextract( )

rextract(<input_string>, <pattern_string>)

rextract( ) extracts the indicated substring matched by the Perl 5 style regular expression designated by <pattern_string>. You must enclose the segment you wish to extract in parentheses.

Example:

s='there are 5 nodes down";

n=rextract(s, "there are (\d+) nodes down");

n will have the value 5.

rextractall ( )

rextractall(<input_string>, <pattern_string>)

rextract( ) extracts all indicated substrings matched by the Perl 5 style regular expression designated by <pattern_string>. You must enclose the segments you wish to extract in parentheses.

Example:

s="there are 5 nodes down and 12 disk crashes";

a=rextractall(s, "there are (\d+) nodes down and (\d.) (\w+) crashes");

a will have the value (5, 12, '"disk")

Split ( )

split(<input_string>, [<delimiters>]) returns an array of substrings of <input_string> obtained by splitting up <input_string> at the characters contained in the string <delimiters> (the delimiting characters are not contained in the resulting substrings).

If <delimiters> is omitted, the input string is split up at the whitespace characters \n (newline), \r (carriage returns), and \t (tab).

Example:

s="there are 5 nodes down/up";

arr=split (s, "|"

arr will have the value: (there, are, 5, nodes, down, up)

String ( )

string(<float>|<int>|<boolean>|<string>) returns a string representation of its argument.

This is necessary to use when updating a field in a database that you know to be of a string type with a variable that is currently not a string. Example: (assume OrgNode is pulled from an external SQL database which has a column called AlertKey which is a string):

| | |
|---|---|
| NewAlertKey = 55; | AlertKey is now an Integer OrgNode.Alertxey = string(NewAlertKey); |

Strip ( )

strip(<input_string>, <string_of characters_to_strip>) returns the string obtained by stripping from <input_string> all occurrences in <input_string> of the characters in <string_of_characters_to_strip>.

Example:

s="john's house is on fire!";

s2=strip(s,"'!");

s2 will have the value: "johns house is on fire"

ToLower ( )

toLower(<string>) returns the string obtained by converting <string> to lowercase.

ToUpper ( )

toUpper(<string>) returns the string obtained by converting <string> to uppercase.

For a complete list of all functions, click on the "Functions" button in the Policy Editor.

What is claimed is:

1. A method for handling network events generated in a network in an enterprise, the method comprising:

detecting at least one of a plurality of network events;

collecting at least one of the plurality of network events by an event server, wherein the plurality of network events have event states;

executing, using at least one computing device, a first action node of an action tree in response to the network event, the action tree including a plurality of action nodes, each of the plurality of action nodes includes an action and a decision, and the plurality of action nodes are organized in a hierarchy based on relationships between enterprise-related data objects, the relationships defined by at least one data impact analysis data structure populated with data accessed from a plurality of data sources throughout the network;

changing the event state of the network event to unresolved;

placing the action tree in an hibernation state;

upon determining that the network event has not been resolved, taking the action tree out of the hibernation state;

escalating the network event by accessing a second action node which is higher in the hierarchy of the action tree than the first action node;

upon determining that the network event has been resolved, changing the event state to resolved; and returning the network event to the event server.

2. The method of claim 1 further comprising:

identifying a workstation affected by the detected network event;

determining at least one administrator and at least one business unit affected by the network event; and contacting the at least administrator regarding the detected network event.

3. The method of claim 2, wherein the step of determining at least one administrator and at least one business unit includes the determination being made by traversing the impact data analysis data structure.

4. The method of claim 1, wherein the execution of the action tree is performed by a policy engine.

5. The method of claim 1, wherein the enterprise-related data objects include organization nodes that define the organization structure of the enterprise.

6. The method of claim 5, wherein the organizational structures include at least one of: a host, a communication device, a user and a document.

7. The method of claim 5 further comprising:

accessing the enterprise-related data objects through a networked database.

8. The method of claim 1 further comprising:

hibernating the action tree, including saving a current state of the action tree to a state database.

9. The method of claim 8, wherein the state database is within an impact server.

10. The method of claim 8 further comprising: awakening the action tree from a hibernated state in response to a wakeup call message.

11. The method of claim 10, wherein the wakeup call message is an electronic mail message.

12. A computer for handling network events generated in a network in an enterprise, the computer comprising:

an event broker operative to cause the computer detect at least one of a plurality of network events;

an event server operative to cause the computer to collect at least one of the plurality of network events, wherein the network events have event states; and an impact server operative to cause the computer to:

execute a first action node of an action tree in response to the network event, the action tree including a plurality of action nodes, each of the plurality of action nodes includes an action and a decision, and the plurality of action nodes are organized in a hierarchy based on relationships between enterprise related data objects, the relationships defined by at least one impact analysis data structure populated with data accessed from a plurality of data sources throughout the network;

change the event state of the network event to unresolved;

place the action tree in a hibernation state;

determine that the network event has not been resolved and take the action tree out of the hibernation state;

escalate the network even by accessing a second action node which is higher in the hierarchy of the action tree than the first action node;

determine that the network even has been resolved and change the event state to resolved; and return the network event to the event server.

13. The computer of claim 12, wherein the impact server is further operative to identify a workstation affected by the detected network event, determine at least one administrator and at least one business unit affected by the network event and contact the at least administrator regarding the detected network event.

14. The computer of claim 12 further comprising: a policy engine disposed within the impact server, wherein the execution of the action tree is performed by the policy engine.

15. The computer of claim 14, wherein the enterprise related data objects include organization nodes that define the organization structure of the enterprise.

16. The computer of claim 15, wherein the organizational structures include at least one of: a host, a communication device, a user and a document.

17. The computer of claim 12 further comprising:

a networked database having the enterprise-related data objects stored therein, such that accessing the enterprise-related data objects through a networked database.

18. The computer of claim 12 further comprising:

a state database; and the impact server is further operative to hibernate the action tree, including saving a current state of the action tree to the state database.

19. The computer of claim 18, wherein the impact server is further operative to awaken the action tree from a hibernated state in response to a wakeup call message.

20. The computer of claim 19, wherein the wakeup call message is an electronic mail message.

* * * * *